United States Patent
Akkaraju et al.

(10) Patent No.: US 10,452,819 B2
(45) Date of Patent: Oct. 22, 2019

(54) DIGITAL CREDENTIAL SYSTEM

(71) Applicant: Screening Room Media, Inc., West Hollywood, CA (US)

(72) Inventors: Prem Akkaraju, Los Angeles, CA (US); Giorgio Vanzini, Los Angeles, CA (US)

(73) Assignee: Screening Room Media, Inc., West Hollywood, CA (US)

( * ) Notice: Subject to any disclaimer, the term of this patent is extended or adjusted under 35 U.S.C. 154(b) by 5 days.

(21) Appl. No.: 15/463,308

(22) Filed: Mar. 20, 2017

(65) Prior Publication Data

US 2018/0268114 A1   Sep. 20, 2018

(51) Int. Cl.
*H04L 29/00* (2006.01)
*G06F 21/10* (2013.01)
(Continued)

(52) U.S. Cl.
CPC .......... *G06F 21/105* (2013.01); *G06F 3/0482* (2013.01); *G06F 3/0488* (2013.01); *G06F 2221/0708* (2013.01)

(58) Field of Classification Search
CPC .......... G06F 21/105; G06F 2221/0775; G06F 21/30; G06F 21/31; G06Q 30/0635; G06Q 50/184
See application file for complete search history.

(56) References Cited

U.S. PATENT DOCUMENTS 5,299,263 A   3/1994 Beller et al.
5,781,534 A   7/1998 Perlman et al.
(Continued)

FOREIGN PATENT DOCUMENTS

| CA | 3002977 C | 1/2019 |
| JP | 2014238857 A | * 12/2014 |
| WO | WO-2017079658 A1 | 5/2017 |

OTHER PUBLICATIONS

U.S. Appl. No. 15/344,269, filed Nov. 4, 2016, Monitoring Location of a Client-Side Digital Content Delivery Device to Prevent Digital Content Misuse.
(Continued)

*Primary Examiner* — Brandon S Hoffman
*Assistant Examiner* — Helai Salehi
(74) *Attorney, Agent, or Firm* — Schwegman Lundberg & Woessner, P.A.

(57) ABSTRACT

A method for issuing digital credentials includes assigning a digital credential to a user account maintained by the digital content delivery system; receiving, from a mobile computing device associated with the user account, a first request for the digital credential; in response to receiving the first request: determining whether a current location of the mobile computing device is within a predetermined geographic distance of the selected exhibitor location, and determining whether a remaining amount of time until a scheduled start time of the selected scheduled presentation is less than a threshold amount of time; and in response to determining that either the current location of the mobile computing device is outside of the predetermined geographic distance of the selected exhibitor location or the remaining amount of time until the scheduled start time of the selected scheduled presentation is greater than the threshold amount of time, denying the first request.

20 Claims, 12 Drawing Sheets

(51) Int. Cl.
*G06F 3/0482* (2013.01)
*G06F 3/0488* (2013.01)

(56) References Cited

U.S. PATENT DOCUMENTS

| | | |
|---|---|---|
| 6,012,058 A | 1/2000 | Fayyad et al. |
| 6,330,670 B1 | 12/2001 | England et al. |
| 6,738,427 B2 | 5/2004 | Zetts |
| 6,914,637 B1 | 7/2005 | Wolf et al. |
| 6,968,453 B2 | 11/2005 | Doyle et al. |
| 7,096,481 B1 | 8/2006 | Forecast et al. |
| 7,120,251 B1 | 10/2006 | Kawada et al. |
| 7,565,649 B2 | 7/2009 | Sasabe |
| 7,571,471 B2 | 8/2009 | Sandhu et al. |
| 7,680,929 B1 | 3/2010 | Lyon |
| 7,734,045 B2 | 6/2010 | Sandhu et al. |
| 7,739,744 B2 | 6/2010 | Burch et al. |
| 7,774,824 B2 | 8/2010 | Ross |
| 8,316,421 B2 | 11/2012 | Etchegoyen |
| 8,352,725 B1 | 1/2013 | O'toole, Jr. |
| 8,392,709 B1 | 3/2013 | Agrawal |
| 8,478,693 B1 | 7/2013 | Weigle et al. |
| 8,479,302 B1 | 7/2013 | Lin |
| 8,521,131 B1 | 8/2013 | Ramalingam et al. |
| 8,843,752 B1 | 9/2014 | Priyadarshi et al. |
| 8,943,605 B1 | 1/2015 | Martin et al. |
| 8,990,574 B1 | 3/2015 | Priyadarshi |
| 9,268,920 B1 | 2/2016 | Butler et al. |
| 9,450,983 B2 | 9/2016 | Huang et al. |
| 9,778,653 B1 | 10/2017 | Mcclintock et al. |
| 9,818,264 B2 * | 11/2017 | Karpe ............... G07F 17/329 |
| 9,881,140 B2 | 1/2018 | Baldwin |
| 2003/0005287 A1 | 1/2003 | Wray et al. |
| 2003/0028454 A1 | 2/2003 | Ooho et al. |
| 2003/0084000 A1 | 5/2003 | Ramachandran et al. |
| 2003/0142587 A1 | 7/2003 | Zeitzew |
| 2003/0184431 A1 | 10/2003 | Lundkvist |
| 2003/0233563 A1 | 12/2003 | Kruse |
| 2004/0014457 A1 | 1/2004 | Stevens |
| 2004/0133789 A1 | 7/2004 | Gantman et al. |
| 2004/0193902 A1 | 9/2004 | Vogler et al. |
| 2005/0070257 A1 * | 3/2005 | Saarinen ............... G07B 15/00 455/414.1 |
| 2005/0192902 A1 | 9/2005 | Williams |
| 2005/0278775 A1 | 12/2005 | Ross |
| 2006/0156415 A1 | 7/2006 | Rubinstein et al. |
| 2006/0190413 A1 | 8/2006 | Harper |
| 2007/0033422 A1 | 2/2007 | Lee |
| 2007/0100771 A1 | 5/2007 | Eckleder et al. |
| 2007/0113081 A1 | 5/2007 | Camp |
| 2007/0130468 A1 | 6/2007 | Cunningham et al. |
| 2007/0200918 A1 | 8/2007 | Kwon et al. |
| 2007/0203850 A1 | 8/2007 | Singh et al. |
| 2007/0220575 A1 | 9/2007 | Cooper et al. |
| 2007/0220594 A1 | 9/2007 | Tulsyan |
| 2007/0233602 A1 | 10/2007 | Zweig et al. |
| 2007/0234408 A1 | 10/2007 | Burch et al. |
| 2007/0258585 A1 | 11/2007 | Sandhu et al. |
| 2007/0258594 A1 | 11/2007 | Sandhu et al. |
| 2008/0022003 A1 | 1/2008 | Alve |
| 2008/0109911 A1 | 5/2008 | Tedesco et al. |
| 2008/0126591 A1 | 5/2008 | Kwon |
| 2008/0178284 A1 | 7/2008 | Harwell |
| 2008/0271104 A1 | 10/2008 | Perry et al. |
| 2008/0289030 A1 | 11/2008 | Poplett |
| 2008/0307515 A1 | 12/2008 | Drokov et al. |
| 2009/0012901 A1 | 1/2009 | Singh et al. |
| 2009/0037388 A1 | 2/2009 | Cooper et al. |
| 2009/0116703 A1 | 5/2009 | Schultz |
| 2009/0141810 A1 | 6/2009 | Tabatabai et al. |
| 2009/0217043 A1 | 8/2009 | Metke et al. |
| 2009/0220075 A1 | 9/2009 | Sidhu et al. |
| 2009/0260043 A1 | 10/2009 | Tatsuta et al. |
| 2009/0262069 A1 | 10/2009 | Huntington |
| 2010/0132019 A1 | 5/2010 | Hardt |
| 2010/0153451 A1 | 6/2010 | Delia et al. |
| 2010/0202609 A1 | 8/2010 | Sandhu et al. |
| 2010/0269147 A1 | 10/2010 | Zetterower et al. |
| 2011/0043707 A1 | 2/2011 | Umezu |
| 2011/0047117 A1 | 2/2011 | Sinha |
| 2011/0156867 A1 | 6/2011 | Carrizo et al. |
| 2011/0191859 A1 | 8/2011 | Naslund et al. |
| 2011/0225659 A1 | 9/2011 | Isaacson et al. |
| 2011/0289113 A1 | 11/2011 | Arling et al. |
| 2011/0289116 A1 | 11/2011 | Horadan |
| 2011/0320819 A1 | 12/2011 | Weber et al. |
| 2012/0025950 A1 | 2/2012 | Von Tippelskirch et al. |
| 2012/0072898 A1 | 3/2012 | Pappas et al. |
| 2012/0089835 A1 | 4/2012 | Peckover |
| 2012/0151515 A1 | 6/2012 | Atsmon et al. |
| 2012/0173353 A1 | 7/2012 | Rausch et al. |
| 2012/0203978 A1 | 8/2012 | Hori et al. |
| 2012/0221860 A1 | 8/2012 | Hoornaert et al. |
| 2012/0251076 A1 | 10/2012 | Stewart et al. |
| 2012/0254432 A1 | 10/2012 | Roseborough et al. |
| 2012/0297368 A1 | 11/2012 | Bingell et al. |
| 2012/0311723 A1 | 12/2012 | Britt, Jr. et al. |
| 2012/0323647 A1 | 12/2012 | Klooster |
| 2013/0051554 A1 | 2/2013 | Braness et al. |
| 2013/0074164 A1 | 3/2013 | Bartlett |
| 2013/0139269 A1 | 5/2013 | Shaikh et al. |
| 2013/0139271 A1 | 5/2013 | Arrelid et al. |
| 2013/0152211 A1 | 6/2013 | Wu et al. |
| 2013/0174273 A1 | 7/2013 | Grab et al. |
| 2013/0208103 A1 | 8/2013 | Sands et al. |
| 2013/0217332 A1 | 8/2013 | Altman et al. |
| 2013/0268357 A1 | 10/2013 | Heath |
| 2013/0347056 A1 | 12/2013 | Kuhlman et al. |
| 2014/0013434 A1 | 1/2014 | Ranum et al. |
| 2014/0090008 A1 | 3/2014 | Li et al. |
| 2014/0096204 A1 | 4/2014 | Hoesl |
| 2014/0115330 A1 | 4/2014 | Chen |
| 2014/0115624 A1 | 4/2014 | Chen |
| 2014/0115718 A1 | 4/2014 | Kellerman et al. |
| 2014/0134951 A1 | 5/2014 | Paulson |
| 2014/0157312 A1 | 6/2014 | Williams et al. |
| 2014/0189780 A1 | 7/2014 | He |
| 2014/0245393 A1 | 8/2014 | Worrall et al. |
| 2014/0259047 A1 | 9/2014 | Bakar et al. |
| 2014/0279614 A1 | 9/2014 | Lonstein et al. |
| 2014/0310779 A1 | 10/2014 | Lof et al. |
| 2014/0325676 A1 | 10/2014 | Beauvais et al. |
| 2014/0364056 A1 | 12/2014 | Belk et al. |
| 2014/0366159 A1 | 12/2014 | Cohen |
| 2015/0003595 A1 | 1/2015 | Yaghi et al. |
| 2015/0012752 A1 | 1/2015 | Priyadarshi et al. |
| 2015/0020151 A1 | 1/2015 | Ramanathan |
| 2015/0074253 A1 | 3/2015 | Lee et al. |
| 2015/0135337 A1 | 5/2015 | Fushman et al. |
| 2015/0170225 A1 | 6/2015 | Belleroche |
| 2015/0178478 A1 | 6/2015 | Kocher et al. |
| 2015/0195275 A1 | 7/2015 | Priyadarshi |
| 2015/0242932 A1 | 8/2015 | Beguin et al. |
| 2015/0295921 A1 | 10/2015 | Cao |
| 2015/0326899 A1 | 11/2015 | Setos |
| 2015/0339461 A1 | 11/2015 | Min et al. |
| 2015/0341359 A1 | 11/2015 | Yang et al. |
| 2015/0365384 A1 | 12/2015 | Rider Jimenez |
| 2016/0099856 A1 | 4/2016 | Ramaswamy et al. |
| 2016/0105707 A1 | 4/2016 | Chen et al. |
| 2016/0180072 A1 | 6/2016 | Ligatti et al. |
| 2016/0196577 A1 | 7/2016 | Reese et al. |
| 2016/0224766 A1 | 8/2016 | Steelberg et al. |
| 2016/0232463 A1 | 8/2016 | Mcdonough et al. |
| 2016/0239870 A1 | 8/2016 | Mishra et al. |
| 2016/0269376 A1 | 9/2016 | Goyal |
| 2016/0277410 A1 | 9/2016 | Kalb et al. |
| 2016/0316248 A1 | 10/2016 | Hao et al. |
| 2016/0357977 A1 | 12/2016 | Manago et al. |
| 2017/0006032 A1 | 1/2017 | Simpson et al. |
| 2017/0124296 A1 | 5/2017 | Baldwin et al. |
| 2017/0124297 A1 | 5/2017 | Baldwin et al. |
| 2017/0124298 A1 | 5/2017 | Baldwin et al. |
| 2017/0124299 A1 | 5/2017 | Baldwin et al. |

(56) References Cited

U.S. PATENT DOCUMENTS

| 2017/0124300 A1 | 5/2017 | Baldwin et al. |
| 2017/0124301 A1 | 5/2017 | Baldwin et al. |
| 2017/0124302 A1 | 5/2017 | Baldwin et al. |
| 2017/0124303 A1 | 5/2017 | Baldwin et al. |
| 2017/0126641 A1 | 5/2017 | Thomas et al. |
| 2017/0126698 A1 | 5/2017 | Minkovich et al. |
| 2017/0134458 A1 | 5/2017 | Lau et al. |
| 2018/0041517 A1 | 2/2018 | Lof et al. |

OTHER PUBLICATIONS

U.S. Appl. No. 15/344,278, filed Nov. 4, 2016, Pairing Devices to Prevent Digital Content Misuse.
U.S. Appl. No. 15/344,286, filed Nov. 4, 2016, Detecting Digital Content Misuse Based on Digital Content Usage Clusters.
U.S. Appl. No. 15/344,295, filed Nov. 4, 2016, Detecting Digital Content Misuse Based on Know Violator Usage Clusters.
U.S. Appl. No. 15/344,303, filed Nov. 4, 2016, Monitoring Nearby Mobile Computing Devices to Prevent Digital Content Misuse.
U.S. Appl. No. 15/344,368 U.S. Pat. No. 9,881,140, filed Nov. 4, 2016, Presenting Sonic Signals to Prevent Digital Content Misuse.
U.S. Appl. No. 15/344,376, filed Nov. 4, 2016, Monitoring Digital Content Usage History to Prevent Digital Content Misuse.
U.S. Appl. No. 15/344,382, filed Nov. 4, 2016, Digital Credential System.
"U.S. Appl. No. 15/344,303, Non Final Office Action dated Jul. 6, 2018", 18 pgs.
"European Application Serial No. 16863103.4, Extended European Search Report dated Jul. 6, 2018", 9 pgs.
"U.S. Appl. No. 15/344,368, Examiner Interview Summary dated Jun. 22, 2017", 3 pgs.
"U.S. Appl. No. 15/344,368, Non Final Office Action dated Mar. 24, 2017", 17 pgs.
"U.S. Appl. No. 15/344,368, Notice of Allowance dated Oct. 5, 2017", 22 pgs.
"U.S. Appl. No. 15/344,368, Response filed Jun. 21, 2017 to Non Final Office Action dated Mar. 24, 2017", 12 pgs.
"International Application Serial No. PCT/US2016/060681, International Preliminary Report on Patentability dated May 17, 2018", 9 pgs.
"International Application Serial No. PCT/US2016/060681, International Search Report dated Feb. 6, 2017", 2 pgs.
"International Application Serial No. PCT/US2016/060681, Written Opinion dated Feb. 6, 2017", 7 pgs.
"U.S. Appl. No. 15/344,269, Non Final Office Action dated Aug. 6, 2018", 13 pgs.
"U.S. Appl. No. 15/344,278, Non Final Office Action dated Aug. 3, 2018", 13 pgs.
"U.S. Appl. No. 15/344,286, Non Final Office Action dated Aug. 7, 2018", 13 pgs.
"U.S. Appl. No. 15/344,269, Notice of Allowance dated Feb. 1, 2019", 14 pgs.
"U.S. Appl. No. 15/344,269, Notice of Allowance dated Apr. 10, 2019", 11 pgs.
"U.S. Appl. No. 15/344,269, Response filed Nov. 2, 2018 to Non Final Office Action dated Aug. 6, 2018", 17 pgs.
"U.S. Appl. No. 15/344,278, Notice of Allowance dated Jan. 29, 2019", 14 pgs.
"U.S. Appl. No. 15/344,278, Response filed Nov. 2, 2018 to Non Final Office Action dated Aug. 3, 2018", 19 pgs.
"U.S. Appl. No. 15/344,278, Notice of Allowability dated Jan. 28, 2019", 6 pgs.
"U.S. Appl. No. 15/344,286, Notice of Allowance dated Dec. 28, 2018", 11 pgs.
"U.S. Appl. No. 15/344,286, Response filed Nov. 2, 2018 to Non Final Office Action dated Aug. 7, 2018", 19 pgs.
"U.S. Appl. No. 15/344,295, Non Final Office Action dated Jan. 11, 2019", 11 pgs.
"U.S. Appl. No. 15/344,295, Notice of Allowance dated Mar. 1, 2019", 11 pgs.
"U.S. Appl. No. 15/344,295, Response filed Jan. 29, 2019 to Non Final Office Action dated Jan. 11, 2019", 12 pgs.
"U.S. Appl. No. 15/344,303, Corrected Notice of Allowability dated Mar. 4, 2019", 3 pgs.
"U.S. Appl. No. 15/344,303, Examiner Interview Summary dated Nov. 8, 2018", 3 pgs.
"U.S. Appl. No. 15/344,303, Notice of Allowance dated Jan. 15, 2019", 12 pgs.
"U.S. Appl. No. 15/344,303, Response filed Oct. 5, 2018 to Non Final Office Action dated Jul. 6, 2018", 18 pgs.
"U.S. Appl. No. 15/344,376, Non Final Office Action dated Aug. 30, 2018", 14 pgs.
"U.S. Appl. No. 15/344,376, Notice of Allowance dated Mar. 13, 2019", 17 pgs.
"U.S. Appl. No. 15/344,376, Response filed Nov. 30, 2018 to Non Final Office Action dated Aug. 30, 2018", 19 pgs.
"U.S. Appl. No. 15/344,382, Non Final Office Action dated Feb. 25, 2019", 9 pgs.
"European Application Serial No. 16863103.4, Response filed Jan. 8, 2019 to Extended European Search Report dated Jul. 6, 2018", 235 pgs.
"U.S. Appl. No. 15/344,382, Response filed May 28, 2019 to Non Final Office Action dated Feb. 25, 2019", 14 pgs.
"U.S. Appl. No. 15/344,376, Notice of Allowance dated May 30, 2019", 10 pgs.
"U.S. Appl. No. 15/344,303, Notice of Allowance dated Apr. 23, 2019", 12 pgs.
"U.S. Appl. No. 15/344,278, Notice of Allowance dated Apr. 22, 2019", 11 pgs.
"U.S. Appl. No. 15/344,295, Notice of Allowance dated May 9, 2019", 9 pgs.
"U.S. Appl. No. 15/344,269, PTO Response to Rule 312 Communication dated May 13, 2019", 2 pgs.
"U.S. Appl. No. 15/344,286, Notice of Allowance dated May 15, 2019", 10 pgs.

* cited by examiner

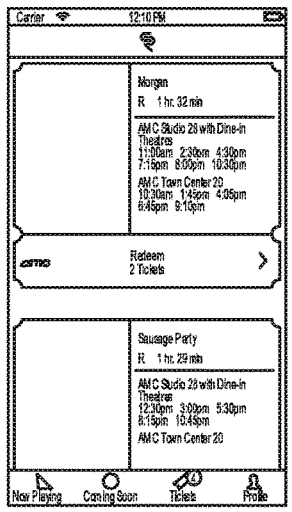 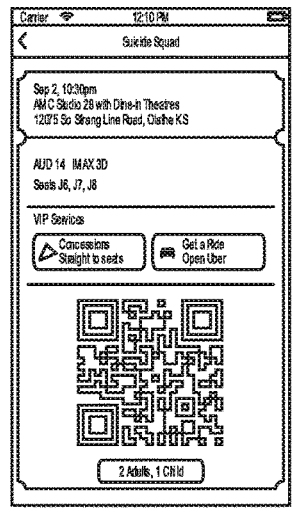 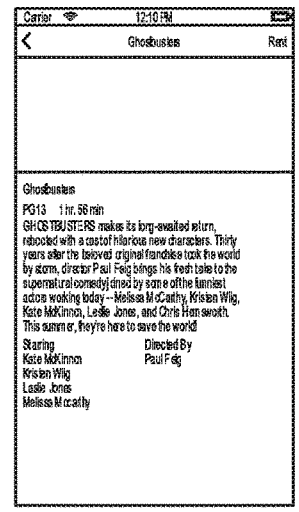
FIG. 6G  FIG. 6H  FIG. 6I
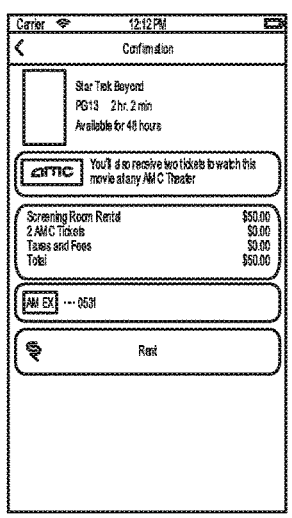 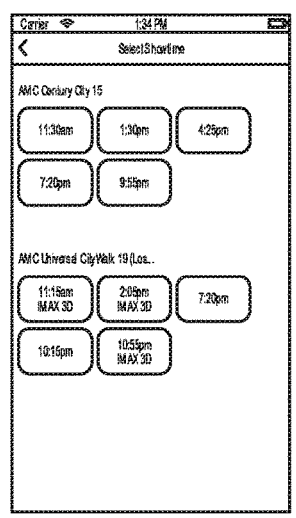 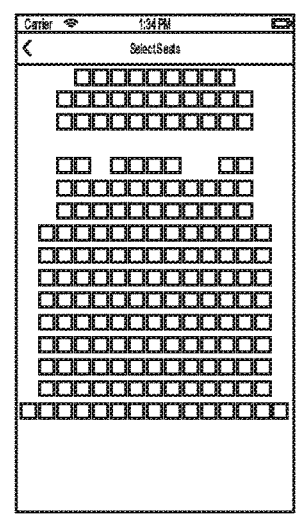
FIG. 6J  FIG. 6K  FIG. 6L

US 10,452,819 B2

DIGITAL CREDENTIAL SYSTEM

BACKGROUND

With the advent of digital data and the Internet, digital content can now be shared quickly and easily to users in almost any geographic location. For example, digital content posted publicly to websites can be accessed by any user with a computer and internee connection. Although sharing digital content, particularly digital content that is intended to be accessed with no restrictions, has become much easier, the threat of unauthorized access and/or use of digital content that is intended to be restricted has increased. For example, some digital content can be intended to be accessed and/or used under specified restricted conditions, such as confidential content, sensitive content, licensed content, etc.

Current systems focus their security efforts on restricting initial access to digital content, and provide little to no security once initial access has been granted. For example, many systems will require initial user authentication (e.g., user name, password, device recognition, etc.) prior to providing access to digital content, but do not monitor use of the digital content after initial access is granted. As a result, digital content can easily be misused, copied, shared, etc. Accordingly, improvements are needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 6A-6L are screenshots of an example exhibitor interface.

DETAILED DESCRIPTION

Glossary

Figure 1:
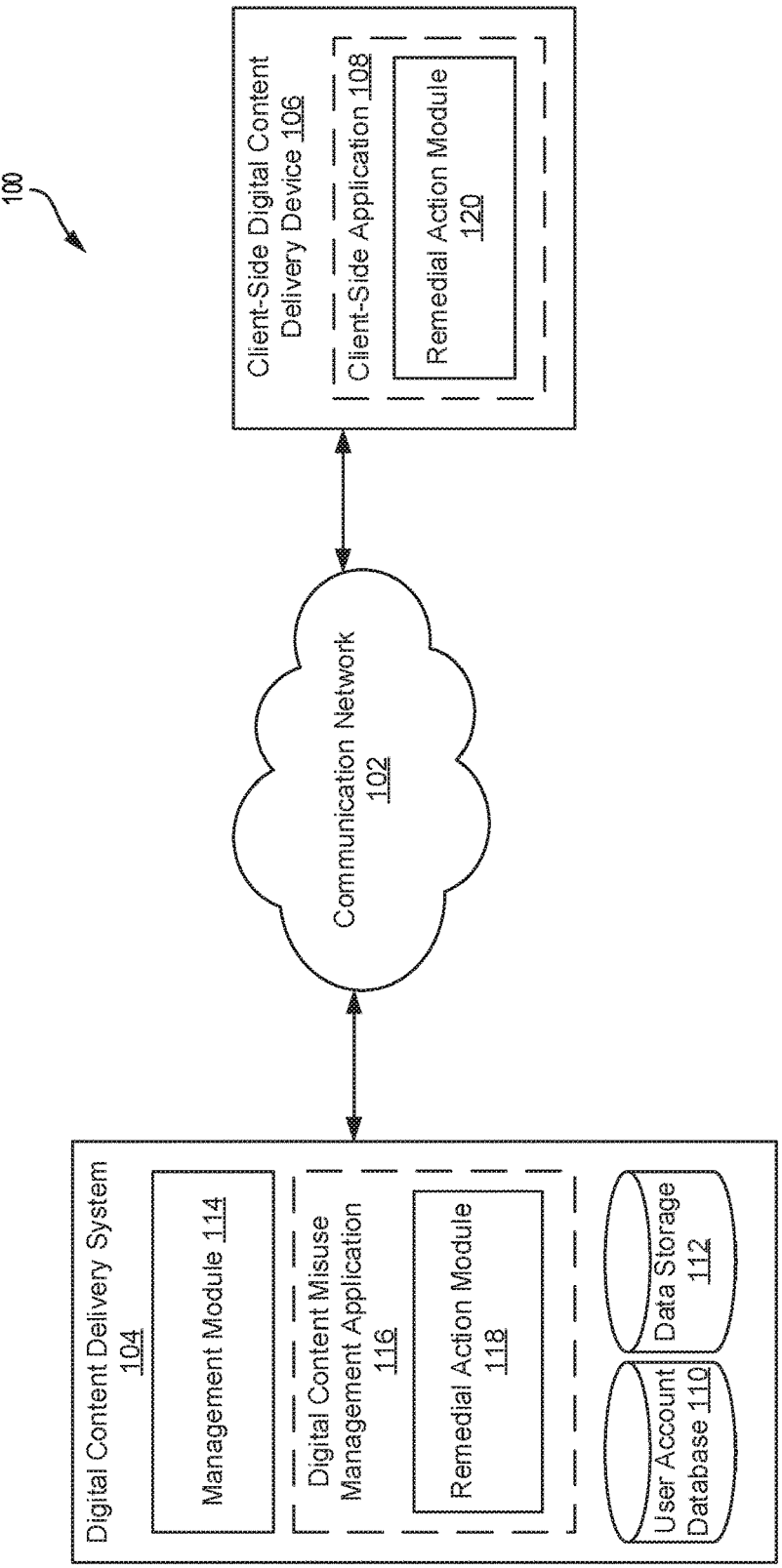
FIG. 1 is a schematic diagram showing an example digital content distribution network.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT-SIDE DIGITAL CONTENT DELIVERY DEVICE" in this context refers to any machine that interfaces to a communication network to obtain resources from one or more server systems or other computing device. A client-side digital content delivery device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATION NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LIE) standard, others defined by various standard setting organizations, other long range protocols, or other data transfer technology.

"DIGITAL CONTENT DELIVERY SYSTEM OR DIGITAL CONTENT DISTRIBUTION NETWORK" in this context refers to a system of distributed servers (e.g. networked proxy server) that deliver digital content to a user.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner.

In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC).

A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers examples of machines including processors), with these operations being accessible via a network (e.g., the Internet) and via one or more appropriate interfaces (e.g., an Application Program interface (API)), The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated. Circuit (RFIC) or any combination thereof. A processor may further be a multi-core processor having two or more independent processors (sometimes referred to as "cores") that may execute instructions contemporaneously.

Description

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SCREENING ROOM MEDIA, INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Drawings

The current application discloses a number of technologies that may be used, in example embodiments, to address and mitigate challenges with enforcing access and/or usage restrictions on digital content. These technologies monitor use of digital content and suspend or terminate access to digital content when certain behaviors are detected.

FIG. 1 shows an example digital content distribution network. It shall be appreciated that although the various functional components of network 100 are discussed in a singular sense, multiple instances of one or more of the various functional components may be employed.

Network 100 includes multiple computing devices connected to communication network 102 and configured to communicate with each other through use of communication network 102. A computing device can be any type of general computing device capable of network communication with other computing devices. For example, a computing device can be a personal computing device such as a desktop or workstation, a business server, or a portable computing device, such as a laptop, smart phone, or a tablet PC. A computing device includes some or all of the features, components, and peripherals of machine 900 of FIG. 9.

To facilitate communication with other computing devices, a computing device includes a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

Network 100 includes digital content delivery system 104 and client-side digital content delivery device 106 that are configured to provide digital content to users, as well as to enforce access and/or usage restrictions on the digital content. Digital content includes any type of digital content or data, such as text files, video files, music files, etc. Digital content can be associated with one or more intended restrictions on access and/or use of the digital content. For example, digital content includes confidential data and/or sensitive data, such as personal information (e.g., social security number), financial information (e.g., bank records, account numbers, etc.), medical records, confidential work materials, etc., that are restricted for use by specified people. Digital content can also include licensed content, such as movie rentals, movie purchases, music rentals, etc., that can be restricted for use by a specified person or audience, during specified times, etc.

Restrictions includes any type of restriction regarding accessing and/or using the digital content, such as a specified user or specified set of users that can access and/or use the digital content, a specified time period during which the digital content can be accessed and/or used, a specified geographic location where the digital content can be accessed and/or used, restrictions on how the digital content can be accessed and/or used, restrictions on whether the digital content can be copied and/or shared, etc.

In network 100, digital content delivery system 104 and client-side digital content delivery device 106 work together to provide users with access to digital content, as well as to enforce access and/or usage restrictions on the digital content. For example, digital content delivery system 104 and client-side digital content delivery device 106 monitor one or more usage signals to ensure that digital content is not being misused (e.g., that restrictions associated with the digital content are not being violated). In the event that digital content is being misused, or is potentially being misused, digital content delivery system 104 and/or client-side digital content delivery device 106 execute one or more remedial actions, such as suspend or terminate a user's access to the digital content, gather additional data, investigate use of the digital content, etc.

In network 100, a user interacts with digital content delivery system 104 through client-side digital content delivery device 106 connected to communication network 102 by direct and/or indirect communication. Digital content delivery system 104 includes computing devices configured to work with client-side digital content delivery device 106 to provide users with digital content, as well as to enforce access and/or usage restrictions on the digital content. Digital content delivery system 104 supports connections from a variety of different types of client-side digital content delivery devices 106, such as desktop computers; mobile computers; mobile communications devices (e.g. mobile phones, smart phones, tablets, etc.); smart televisions; set-top boxes; and/or any other network-enabled computing devices. Client-side digital content delivery device 106 can be of varying type, capabilities, operating systems, etc. Furthermore, digital content delivery system 104 can concurrently accept connections from and interact with multiple client-side digital content delivery devices 106.

A user interacts with digital content delivery system 104 via client-side application 108 installed on client-side digital content delivery device 106. In some embodiments, client-side application 108 includes a digital content delivery system-specific component. For example, the component can be a stand-alone application, one or more application plug-ins, and/or a browser extension, Client-side application 108 can present a user interface (UI) for the user to interact with digital content delivery system 104. For example, the UI provides the user with digital content as well as include one or more user interface elements (e.g., buttons, text fields, etc.) to enable a user to interact with digital content delivery system 104.

Additionally, client-side application 108 presents a user with digital content. Client-side application 108 can use output devices (e.g., display, speaker, etc.) of client-side digital content delivery device 106 and/or a secondary computing device (not shown) coupled to client-side digital content delivery device 106 to present digital content received from digital content delivery system 104. For example, where client-side digital content delivery device 106 is a mobile phone, client-side application 108 can cause presentation of digital content using a display and/or speaker of the mobile phone. As another example, where client-side digital content delivery device 106 is a set-top box, client-side application 108 can cause presentation of digital content on a display of a viewing device (e.g., television, monitor, etc.) that is connected to the set-top box.

Client-side application 108 embed digital content with a digital watermark that can be used if the digital content has been misused. For example, the digital watermark can be embedded with an identifier for client-side digital content delivery device 106. Once embedded in the digital content, the digital watermark is present in any copies made of the digital content, including unauthorized copies. Hence, if an unauthorized copy of digital content is found, the digital watermark embedded in the unauthorized copy can be used to identify the source.

Digital content delivery system 104 can be configured to manage digital content for multiple user accounts. For example, digital content delivery system 104 allows users to store, access, rent and/or purchase digital content.

To facilitate the various services provided by digital content delivery system 104, a user can create a user account with digital content delivery system 104. The account information for each created user account is maintained in user account database 110. User account database 110 stores profile information for each user account, including a unique account identifier identifying the user account, personal information, username, password, email address, home address, credit card information, banking information, etc. User account database 110 also includes account management information, such as data storage locations, security settings, personal configuration settings, device identifier for client-side digital content delivery devices 106 that are authorized to access the user account, etc.

A user account can be used to purchase, rent, manage and store digital content, such as digital data, documents, text files, audio files, video files, etc. For example, digital content delivery system 104 provides an online retailer where users can purchase/rent digital content, such as movies, shows, books, music, etc.

Upon digital content being purchased and/or rented by a user, the user's account is updated to indicate that the user has acquired a license to the purchased and/or rented digital content. This allows the user to access the digital content using client-side digital content delivery devices 106. For example, a digital content identifier identifying rented and/or purchased digital content (e.g., movie) is assigned to a user account in user account database 110 and associated with the corresponding user account. The digital content identifier can be used to identify the digital content as well as the location of the digital content.

Further, the user's account is updated with data defining restrictions associated with the digital content, such users authorized to access or use the digital content, geographic locations where the digital content can be accessed, times during which the digital content can be accessed, etc. The restrictions can be based on a license purchased by the user with respect to digital content. For example, a user may have purchased a limited rental of a movie that entitles the user to view the movie a limited number of times, during a limited time and/or with a limited number of other users.

Digital content can be stored in data storage 112. Data storage 112 can be a storage device, multiple storage devices, or a server. Alternatively, data storage 112 can be a cloud storage provider or network storage accessible via one or more communication networks. Digital content delivery system 104 can hide the complexity and details regarding storage of digital content from client-side digital content delivery device 106 such that the location of digital content stored by digital content delivery system 104 is not known by client-side digital content delivery device 106. Digital content delivery system 104 can store the digital content in a network accessible storage (SAN) device, in a redundant array of inexpensive disks (RAID), etc. Data storage 112 can store digital content using one or more partition types, such as FAT, FAT32, NTFS, EXT2, EXT3, EXT4, ZFS, ReiserFS, BTRFS, and so forth.

Data storage 112 can also store metadata describing digital content, digital content types, and the relationship of digital content to various user accounts. The metadata can be stored as part of the digital content or can be stored separately. In one variation, digital content stored in data storage 112 can be assigned a system-wide unique identifier. In some embodiments, the metadata includes restrictions associated with the digital content.

Digital content delivery system 104 includes management module 114 configured to manage and access each user account and the digital content assigned to the user accounts. For example, management module 114 can be configured to communicate with user account database 110 and data storage 112 to adjust privileges and otherwise manage access to digital content.

Upon a user logging into their user account from client-side digital content delivery device 106, management module 114 can access the account information associated with the user account to identify digital content assigned to the user account, as well as any corresponding restrictions placed on the digital content. Management module 114 can enable a user to access and/or use the digital content assigned to the user's account. For example, management module 114 can access the user's account to identify digital content identifiers assigned to the user account. Management module 114 uses the digital content identifiers to identify and locate the digital content assigned to the user's account, which can be presented according to the account configuration data.

Management module 114 can also update the user's profile to update the user's usage history. Each user's profile includes a usage history indicating the digital content that the user has accessed and/or used, as well as metadata describing each use. This includes the times at which the user accessed and/or used the digital content, as well as any other usage signal data, such as a number of mobile computing devices present during usage, geographic location of the user when accessing the digital content, client-side digital content delivery device 106 used to access the digital content, etc. Management module 114 can access a user's account and update the user's usage history as the user accesses and/or uses digital content to record each use.

As explained above, in network 100, digital content delivery system 104 and client-side digital content delivery device 106 can monitor one or more usage signals to ensure that digital content is not being misused and, in the event that digital content is potentially being misused, execute one or more remedial actions. Usage signals can be any type of data gathered with regard to presenting digital content. For example, usage signals includes the user's usage history, frequency that a user accesses digital content, a number of times the user has accessed a particular item of digital content (e.g., a particular movie, document, etc.), a number of detected users viewing the digital content, location of the user when accessing digital content, configuration changes prior to or while accessing digital content, etc.

Digital content delivery system 104 and client-side data detection device 106 can each gather and share usage signal data to determine whether digital content is potentially being misused and, in the event that digital content is potentially being misused, execute one or more remedial actions. For example, digital content delivery system 104 includes digital content misuse management application 116 that are configured to determine whether digital content is potentially being misused and, in the event that digital content is potentially being misused, execute one or more remedial actions. Likewise, client-side application 108 can be configured to determine whether digital content is potentially being misused and, in the event that digital content is potentially being misused, execute one or more remedial actions.

A remedial action can be one or more actions performed with the intent of stopping misuse of digital content. For example, a remedial action includes terminating performance of digital content, suspending performance of digital content, disabling client-side digital content delivery device 106, gathering additional data to determine whether a suspected misuse of digital content is in fact a misuse of the content, etc.

A remedial action can be performed by digital content delivery system 104 and/or client-side digital content delivery device 106. As shown, digital content delivery system 104 includes remedial action module 118 configure to execute remedial actions. Likewise, client-side digital content delivery device 106 includes remedial action module 120 configured to execute remedial actions.

A remedial action includes terminating performance of digital content, which can cause the performance of digital content being performed by client-side digital content delivery device 106 to end. For example, remedial action module 118 can cause digital content delivery system 104 to stop transmitting (e.g., streaming, downloading, etc.) the digital content to client-side digital content delivery device 106, thereby terminating performance of the digital content. As another example, remedial action module 118 can transmit a command to client-side digital content delivery device 106 to stop performing the digital content. As another example, remedial action module 120 can cause client-side digital content delivery device 106 to terminate performance of the digital content.

A remedial action includes causing client-side digital content delivery device 106 to suspend performance of digital content. In contrast to terminating performance of digital content, suspending performance includes pausing performance of the digital content. This can be for a specified period of time or until a command is received to resume performance. For example, digital content delivery system 104 can transmit a command to client-side digital content delivery device 106 to resume performance of the suspended digital content. This can be the result of digital content delivery system 104 determining that the digital content is not being misused.

A remedial action includes disabling client-side digital content delivery device 106. Disabling client-side digital content delivery device 106 can cause client-side digital content delivery device 106 to be inoperable to perform any function by the user.

A remedial action includes gathering additional information to determine whether a suspected misuse of digital content is in fact a misuse. Remedial action module 118 and/or remedial action module 120 can cause social media activity of one or more users associated with client-side digital content delivery device 106 to be scanned to gather information indicating that the user(s) are misusing digital content. For example, remedial action module 118 and/or remedial action module 120 can scan a user's social media activity for postings indicating that the user allowed unauthorized access to digital content (e.g., hosting viewing of movies for large audiences).

A remedial action includes simply presenting a user with a warning or message indicating that the user is suspected of misusing digital content. Although several examples of remedial actions are given, these are just some examples and are not meant to be limiting.

Figure 2:
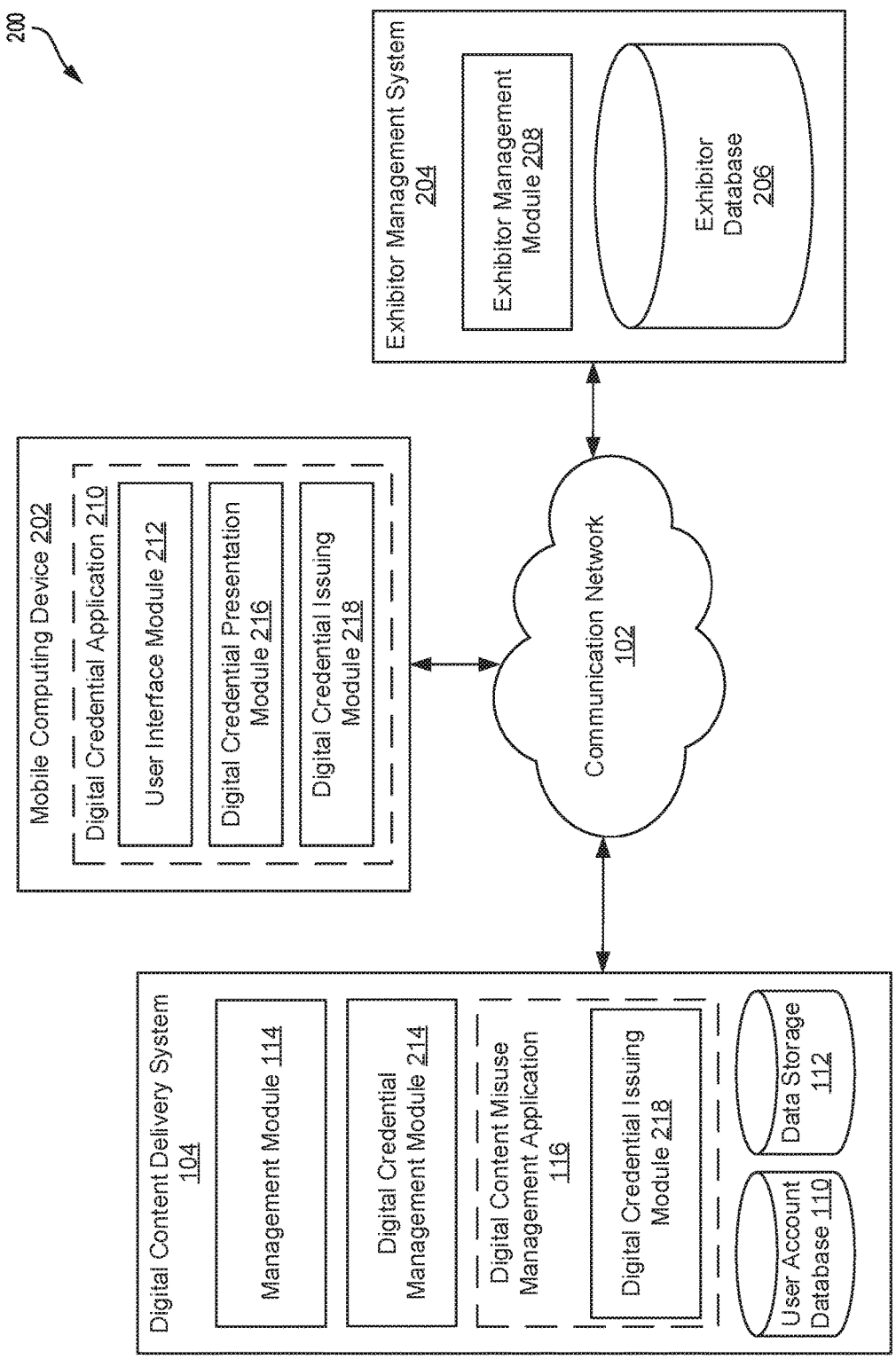
FIG. 2 is a schematic diagram showing an example system configured to issue digital credentials.

FIG. 2 shows an example system 200 configured to issue digital credentials (e.g., digital tickets). To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported to facilitate additional functionality that is not specifically described herein. Furthermore, the various functional modules depicted in FIG. 2 may reside on a single computing device or may be distributed across several computing devices in various arrangements such as those used in cloud-based architectures.

Digital content delivery system 104 issues digital credentials that are redeemable by a user. For example, a digital credential can be redeemed to provide a user with access to an exhibitor location, such as a movie theatre, to view a scheduled presentation of a digital content item (e.g., a movie).

A digital content license acquired by a user allows the user to access the digital content item using client-side digital content delivery device 106 and/or attend a scheduled presentation of the digital content item at an exhibitor location. As an example, a user that purchases a movie rental that can be streamed to the user's client-side digital content delivery device 106 can also be allotted two tickets (i.e., digital credentials) to view the movie at a movie theatre until the movie is no longer available. A user can therefore choose to view the movie rental at home and/or view the movie at a movie theater.

Digital content delivery system 104 uses security measures to prevent misuse of digital credentials, such as digital credentials being issued to an incorrect user and/or the digital credential being utilized in violation of a licensing agreement (e.g., the digital credential being redeemed by an incorrect user and/or the digital credential being resold).

To prevent misuse of a digital credential, access to the digital credential can be restricted to a specified time frame and location. For example, the digital content delivery system 104 provides the user with the digital credential upon determining that a current location of a user is within a predetermined geographic distance of a selected exhibitor location and/or a remaining amount of time until the selected scheduled presentation begins is less than the threshold amount of time. As another example, the user can be initially presented with an obfuscated (e.g., blurred, modified, overlaid) rendering of the digital credential until the user is determined to be within the predetermined geographic distance of the selected exhibitor location and/or the remaining amount of time until the selected scheduled presentation begins is less than the threshold amount of time, after which the user is presented with a clear rendering of the digital credential. Hence, a user can be required to be physically nearby the exhibitor location (e.g., within 100 feet of the movie theater) and/or wait until shortly before the scheduled presentation (e.g., 15 minutes before the scheduled start time of the movie) to access their digital credential.

In FIG. 2, digital content delivery system 104, mobile computing device 202, and exhibitor management system 204 communicate with each other via communication network 102 to reserve and issue digital credentials that can be redeemed by a user to access a scheduled presentation of a digital content item at an exhibitor location.

Exhibitor management system 204 can be a computing system comprising computing devices associated with an exhibitor. An exhibitor can be an organization, business, etc., that provides scheduled presentations of digital content at one or more exhibitor locations. For example, an exhibitor can be a movie theatre chain that provides scheduled showings of movies at one or more movie theaters.

Exhibitor management system 204 includes exhibitor database 206 that maintains exhibitor data describing scheduled presentations of digital content items provided by the exhibitor. Exhibitor data includes data identifying the exhibitor locations associated with the exhibitor (e.g., movie theatres), the digital content items scheduled for presentation at each exhibitor location (e.g., movies) and/or scheduled presentations at each exhibitor location (e.g., scheduled show times). Exhibitor data can also include data identifying digital credential availability for each scheduled presentation (e.g., number of unsold digital credentials available for purchase), seating charts for each exhibitor location, seating availability (e.g., unreserved seats), amenities provided by each exhibitor location, the address of each exhibitor location, etc. Exhibitor data can also include content associated with the exhibitor, exhibitor locations, and/or digital content items. For example, exhibitor data includes content such as written movie description, movie trailers, movie reviews, movie theatre reviews, etc.

Exhibitor management system 204 includes exhibitor management module 208 configured to reserve digital credentials and amenities for scheduled presentations of digital content items, Exhibitor management module 208 can communicate with exhibitor database 206 to gather requested exhibitor data, provide requested exhibitor data to requesting computing devices and/or update exhibitor data to reflect a reservation of a digital credential and/or amenity. For example, exhibitor management module 208 can process read requests for exhibitor data such as show times for a specified movie, theatres within a predetermined geographic area that are presenting a specified movie, digital credential and/or seating availability for one or more scheduled presentations, available amenities at an exhibitor location, movie trailers, movie reviews, etc. In response to receiving a read request for exhibitor data, exhibitor management module 208 can gather the requested exhibitor data from exhibitor database 206 and return the requested exhibitor data in response to the read request.

Exhibitor management module 208 can also process reservation requests. A reservation request can be a request to reserve digital credentials and/or amenities for a scheduled presentation of a digital content item. In response to receiving a reservation request, exhibitor management module 208 can initially confirm whether the reservation request can be fulfilled. For example, exhibitor management module 208 can determine whether there are a sufficient number of available digital credentials to fulfill the reservation request.

As another example, exhibitor management module 208 can determine whether selected seats are available to be reserved. If exhibitor management module 208 determines that the reservation request can be fulfilled, exhibitor management module 208 can update exhibitor database 206 to fulfill the request. For example, exhibitor management module 208 can update exhibitor database 206 to indicate that requested digital credentials have been reserved, update the number of reserved digital credentials for the scheduled presentation, update a seating chart to reflect that specific seats have been reserved, etc.

Exhibitor management module 208 can also generate and provide reservation data reflecting that a requested reservation has been completed. Reservation data includes data indicating that the reservation request has been completed as well as data that can be used to redeem or confirm the reservation at an exhibitor location. For example, reservation data includes a unique code associated with reserved digital credentials, reserved seats, reserved amenities, etc., that can be used by an exhibitor to confirm the reservation. Reservation data can also include data describing the reservation, such as reserved seats, selected exhibitor location, selected scheduled presentation, reserved amenities (e.g., purchased food items), purchasing user, etc. in some embodiments, the reservation data can be provided to a user for use at the exhibitor. The reservation data can also be provided directly to the exhibitor location.

In system 200, a user uses mobile computing device 202 to reserve a digital credential for a scheduled presentation of a digital content item, as well as reserve amenities. As shown, mobile computing device 202 includes digital credential application 210. Digital credential application 210 enable a user to communicate with digital content delivery system 104 to request exhibitor data as well as to reserve digital credentials and/or amenities. Digital credential application 210 includes user interface module 212 configured to present a user with an exhibitor interface including user interface elements (e.g., buttons, text fields, etc.) that a user uses to request and select data. For example, the exhibitor interface provides a user with a listing of scheduled presentations for a digital content item and allow the user to reserve digital credentials to one or more of the listed scheduled presentations. As another example, the exhibitor interface provides a user with a listing of unreserved seats for a scheduled presentation and allow the user to reserve one or more of the unreserved seats. As another example, the exhibitor interface can enable the user to enter and/or select one or more exhibitor data parameters (e.g., desired movie, desired theatre, desired day/time) and then provide the user with exhibitor data based on the exhibitor data parameters entered and/or selected by the user.

Digital credential application 210 can communicate with digital content delivery system 104 to perform one or more actions requested by the user, such as requests to read exhibitor data, requests to reserve digital credentials and/or amenities, etc. For example, digital credential application 210 can transmit requests to digital content delivery system 104 to perform specified actions, such as requests to read exhibitor data, requests to reserve digital credentials and/or amenities, etc. Digital credential application 210 includes data in the requests that can be used by digital content delivery system 104 to complete the request. For example, the request includes one or more exhibitor data parameters selected by the user.

Digital content delivery system 104 includes digital credential management module 214 configured to receive and respond to requests from mobile computing device 202. For example, digital content delivery system 104 receives a request from mobile computing device 202 for specified exhibitor data and, in response, transmit a read request to exhibitor management system 204 for the specified exhibitor data. Digital content delivery system 104 provides the returned exhibitor data to mobile computing device 202, where it can be presented to a user in an exhibitor interface.

As another example, digital credential management module 214 receives a request from mobile computing device 202 to reserve a digital credential to a scheduled presentation and/or reserve one or more amenities. In response, digital credential management module 214 can transmit a reservation request to exhibitor management system 204 to reserve the digital credential and/or amenities.

Digital credential management module 214 receives reservation data from exhibitor management system 204 confirming that the requested reservation has been completed. In response, digital credential management module 214 can update the requesting user's account in user account database 110 to reflect that the user's requested reservation has been completed and that the requested digital credential and/or amenities are assigned to the requesting user's account. For example, digital credential management module 214 can update the requesting user's account with metadata describing the digital credentials assigned to the user's accounts, such as metadata describing a selected exhibitor location, selected scheduled presentation, selected seats, purchased amenities, etc. Digital credential management module 214 can also store any unique codes received from exhibitor management system 204 that can be used by a user to redeem the digital credentials assigned to the user's account and/or any reserved amenities.

In some embodiments, digital credential management module 214 provides a user with exhibitor data and/or reserve a digital credential for the user based on a digital content license assigned to the user's account. For example, a digital content license can allow the user to access the digital content item using client-side digital content delivery device 106 and/or attend a scheduled presentation of the digital content item at an exhibitor location. In this type of scenario, a user that purchases a movie rental that can be streamed to the user's client-side digital content delivery device 106 can also be allotted two digital credentials to view the movie at a movie theatre. A user can therefore choose to view the movie rental at home and/or view the movie at a movie theater.

A digital content license purchased by a user may be associated with a particular exhibitor. For example, the exhibitor can be an exhibitor that operates within a geographic region where the user resides. As another example, the exhibitor can be an exhibitor selected by the user as the user's preferred exhibitor. In some instances, the exhibitor may receive a portion of the revenue associated with the user's purchase of the digital content license to access the digital content item.

In this type of scenario, digital credential management module 214 presents the user with exhibitor data and/or reserve a digital credential based on the digital content license purchased by the user and assigned to the user's account. This includes enabling the user to reserve a digital credential for a scheduled presentation of the digital content item associated with the digital content license and/or a scheduled presentation offered at an exhibitor location associated with the digital content license. For example, digital credential management module 214 can access the user's account in user account database 110 to identify a digital content license assigned to the user's account. Based on the digital content license, digital credential management module 214 can determine a digital content item that the user has purchased a license to access, and an exhibitor or set of exhibitors associated with the digital content item. Digital credential management module 214 uses the determined digital content item and exhibitor to transmit a read request to exhibitor management system 204 for exhibitor data describing scheduled performances of the digital content item at exhibitor locations associated with the exhibitor. The returned exhibitor data can identify exhibitor locations and scheduled performances that the user is licensed to attend according to the digital content item assigned to the user's account. For example, the user can select to reserve digital credentials to any one of the scheduled performances.

In some situations, an exhibitor may manage a large number of exhibitor locations, and thus providing the user with exhibitor data for all exhibitor locations may be excessive and/or unnecessary. In this type of situation, digital credential management module 214 provides the user with a subset of exhibitor data based on the location of the user in relation to exhibitor locations managed by the exhibitor. For example, digital credential management module 214 can select a subset of exhibitor locations that are within a predetermined geographic distance of a known dwelling of the user or, alternatively, a determined current location of the user. Digital credential management module 214 can then provide the user with exhibitor data for the subset of exhibitor locations.

Once a digital credential has been reserved and assigned to a user's account, the user uses mobile computing device 202 to retrieve the digital credential. For example, the user uses the exhibitor interface to request that digital credentials assigned to the user's account be transmitted to mobile computing device 202. Digital credential application 210 includes digital credential presentation module 216 configured to receive a digital credential from digital content delivery system 104 and render a visual representation of the digital credential. Once rendered, the digital credential can be redeemed by a user to grant the user access to a selected scheduled presentation of the digital content item.

Digital content delivery system 104 can utilize one or more security measures to prevent misuse of digital credentials, such as digital credentials being issued to an incorrect user and/or the digital credential being utilized in violation of the terms of a digital license (e.g., the digital credential being redeemed by an incorrect user and/or the digital credential being resold).

Digital content misuse management application 116 includes digital credential issuing module 218 configured to prevent misuse of digital credentials. In some embodiments, digital credential application 210 include a portion of digital credential issuing module 218. In embodiments where digital credential application 210 includes a portion of the digital credential issuing module 218, digital credential application 210 can work alone or in conjunction with the portion of digital credential application 210 included in the digital content delivery system 104.

Digital credential issuing module 218 can restrict a user's access to digital credentials assigned to the user's account until one or more conditions are satisfied. One such condition can be based on the location of the user in relation to an exhibitor location. For example, digital credential issuing module 218 can require that the user be located within a predetermined geographic distance of the exhibitor location at which the digital credential can be redeemed. Hence a user cannot access the digital credential until the user is nearby the exhibitor location.

In response to receiving a request to access a digital credential at mobile computing device 202, digital credential issuing module 218 can determine whether a current location of mobile computing device 202 is within a predetermined geographic distance of the exhibitor location where the digital credential can be redeemed. Digital credential issuing module 218 can access the user's account to gather metadata describing the geographic location of the exhibitor location. Digital credential issuing module 218 retrieves the current location of mobile computing device 202 from mobile computing device 202 (e.g., as part of a request received from mobile computing device 202 or in response to a separate request). Digital credential issuing module 218 uses the current location of mobile computing device 202 and the geographic location of the exhibitor location to determine whether the current location of mobile computing device 202 is within the predetermined geographic distance of the exhibitor location.

Another condition can be based on the current time in relation to a start time of the scheduled presentation. For example, digital credential issuing module 218 can require that a remaining amount of time until a start time of the scheduled presentation be less than a threshold amount of time. Hence a user cannot access the digital credential until a short time before the start of the scheduled presentation. Digital credential issuing module 218 can access the user's account to gather metadata describing the scheduled start time of the scheduled presentation and determine whether a remaining amount of time until the scheduled start time (e.g., a time duration between the current time and the scheduled start time) is less than the threshold amount of time.

Another condition can be based on the requesting mobile computing device. For example, digital credential issuing module 218 can restrict access to the digital credential to one or more mobile computing devices authorized with the user's account. In some embodiments, device identifiers for the authorized mobile computing device(s) can be stored in the user's account. Digital credential issuing module 218 can request a device identifier from a mobile computing device 202 requesting digital credentials and then access the user's account to determine whether the device identifier received from mobile computing device 202 is included in the list of authorized device identifiers.

Digital credential issuing module 218 operatively denies a request to issue a digital credential if one or more of the described conditions are not satisfied. For example, digital credential issuing module 218 can require that all conditions be satisfied for the request to be approved (e.g., the user be located nearby the theatre, the movie to start shortly and the requesting mobile computing device be authorized on the user's account). Alternatively, in some embodiments, digital credential issuing module 218 can require that at least one or two of the conditions be satisfied for the request to be approved.

If digital credential issuing module 218 determines that a sufficient number of conditions have been satisfied, digital credential issuing module 218 can transmit the digital credential to mobile computing device 202, This includes gathering and providing reservation data associated with the digital credential to mobile computing device 202. For example, digital credential issuing module 218 can access the user's account to access the reservation data associated with the digital credential.

Once the reservation data is received by mobile computing device 202, digital credential presentation module 216 uses the reservation data to render a graphical representation of the digital credential, such as scannable code (e.g., Quick Response (QR) code, bar code, number code etc.). The scannable code can be embedded with reservation data that can be used to confirm the user's reservation. For example, the scannable code can be embedded with the unique code associated with the reservation of the digital credentials, the number of digital credentials purchased, reserved seats, purchaser name, etc. The scannable code can be scanned at an exhibitor location using a scanning device capable of reading the scannable code to retrieve the reservation data embedded in the scannable code. Alternatively, the scannable code includes a readable code (e.g., combination of number, letters, symbols, etc.) that an employee can read and/or manually enter into a computing device to retrieve the reservation data.

Digital credential issuing module 218 causes presentation of an obfuscated rendering of a digital credential when one or more conditions have not been satisfied, and then presents a clear rendering of the digital credential when the conditions have been satisfied. An obfuscated rendering can be a visual rendering of the digital credential that has been obfuscated (e.g., blurred, modified, etc.) such that the digital credential (e.g., scannable code) cannot be read and/or scanned by a scanning device or employee at the exhibitor location. In contrast, a clear rendering of the digital credential can be a visual rending of the digital credential that is sufficiently clear such that the digital credential can be scanned by a scanning device and/or read by an employee at the exhibitor location. Accordingly, the visual rendering of the digital credential can be redeemed by the user after the conditions have been met.

Digital credential issuing module 218 may utilize any of a variety of techniques to obfuscate a digital credential. One such technique includes obfuscating presentation of the digital credential in a way that makes it difficult or potentially impossible for a scanning device to discern a precise pattern in the digital credential. To extract data from a scannable code, scanning devices detect light and dark elements to discern a pattern. Obfuscating the scannable code in such a way that prevents a scanning device from discerning the precise pattern renders the scannable code unreadable by the scanning device or causes a misreading by the scanning device.

In some embodiments, digital credential issuing module 218 obfuscates the digital credential by lowering the contrast at which the digital credential is presented. Lowering the contrast causes the dark and light portions of the digital credential to appear blurred into each, thereby making it difficult for a scanning device to discern a precise pattern in the digital credential.

In some embodiments, digital credential issuing module 218 obfuscates the digital credential by rearranging pixels in the digital credential. Rearranging the pixels makes it difficult for a scanning device to discern a precise pattern in the digital credential.

In some embodiments, digital credential issuing module 218 obfuscates the digital credential by applying a digital overlay on the digital credential. A digital overlay can include a filter or other image that is presented over the digital credential, thereby making it difficult for a scanning device to discern a precise pattern in the digital credential. For example, a digital overlay can include a black box that conceals at least a portion of the digital credential or a series of horizontal lines that blur the underlying image.

In some embodiments, digital credential issuing module 218 obfuscates the digital credential by presenting only a portion of the digital credential. By omitting a portion of the digital credential, the scanning device cannot discern the entire pattern needed to extract data.

In addition to obfuscating the digital credential to prevent the scanning device from discerning the pattern in the scannable code, the digital credential may also be modified to violate standards, which cause the scannable code to become unreadable. Many scannable codes require that quiet zones that are free from text, marks, or obstacles surround at least a portion of the scannable code.

Scanning devices have tolerances for minimum allowable quiet zone size. This space provides separation from surrounding marks, allowing the scanning device to "see" the code in its entirety. In 1D barcodes, the quiet zone lies to the left and right ends of the barcode. As a general rule, the quiet zone should be a minimum of 10 times the width of the narrowest bar of the 1D barcode. In 2D symbols, the quiet zone is the space surrounding the entire symbol. Quiet zone requirements for 2D symbols are prescribed by the Association for Automatic Identification and Mobility (AIM), which specifies at least a one-element (or cell) width on each side of the symbol. For best results with large 2D codes, it is typically recommended that the quiet zone be 10% of the symbol height or width, whichever is smaller.

A scanning device may be unable to decode a symbol if text or other markings bleed into the symbol's quiet zone. Quiet zone violations may also yield inaccurately decoded data strings if the scanning device interprets non-symbol elements as part of the overall symbol. Accordingly, in some embodiments, digital credential issuing module 218 obfuscates the digital credential by adding markings, texts, etc., into the designated quiet zone, thereby causing the scannable code to become unreadable or cause an incorrect reading by a scanning device.

These discussed techniques of obfuscating the digital credential are just some examples, and are not meant to be limiting. Digital credential issuing module 218 may employ any know technique to present an obfuscated rendering of a digital credential, including one or more of the techniques describe, either individually or in combination. Further, the level or degree to which digital credential issuing module 218 obfuscates a digital credential may vary based on desired application, the type of scanning devices utilized, etc. While in some embodiments, the obfuscated digital credential is rendered unreadable by a scanning device, this may not always be the case.

In some embodiments, digital credential issuing module 218 continues to monitor the location of client device 202 and/or the current time and restrict access to the digital credentials if the conditions are no longer met. For example, if the user leaves the vicinity of the movie theatre and/or the a specified period of time has passed. Digital credential issuing module 218 can restrict access to the digital credentials by, for example, removing the clear rendering of the digital credential or replacing the clear rendering of the digital credential with an obfuscated rendering of the digital credential.

In addition to restricting access to digital credentials until one or more conditions are satisfied, digital credential issuing module 218 can further implement security features into the visual rendering of the digital credential to prevent misuse. For example, digital credential issuing module 218 includes image data in the digital credential that, when rendered by mobile computing device 202, causes an image of the user associated with the user account to be presented along with the digital credential. An employee at an exhibitor location can therefore visually verify that the user attempting to redeem the digital credential is the user associated with the user account.

As another example, digital credential issuing module 218 includes video data in the digital credential that, when rendered by mobile computing device 202, causes a video and/or animation to be presented along with the digital credential. This can prevent users from creating counterfeit copies of the digital credential by taking a picture and/or screen grab of the rendered digital credential.

Figure 3:
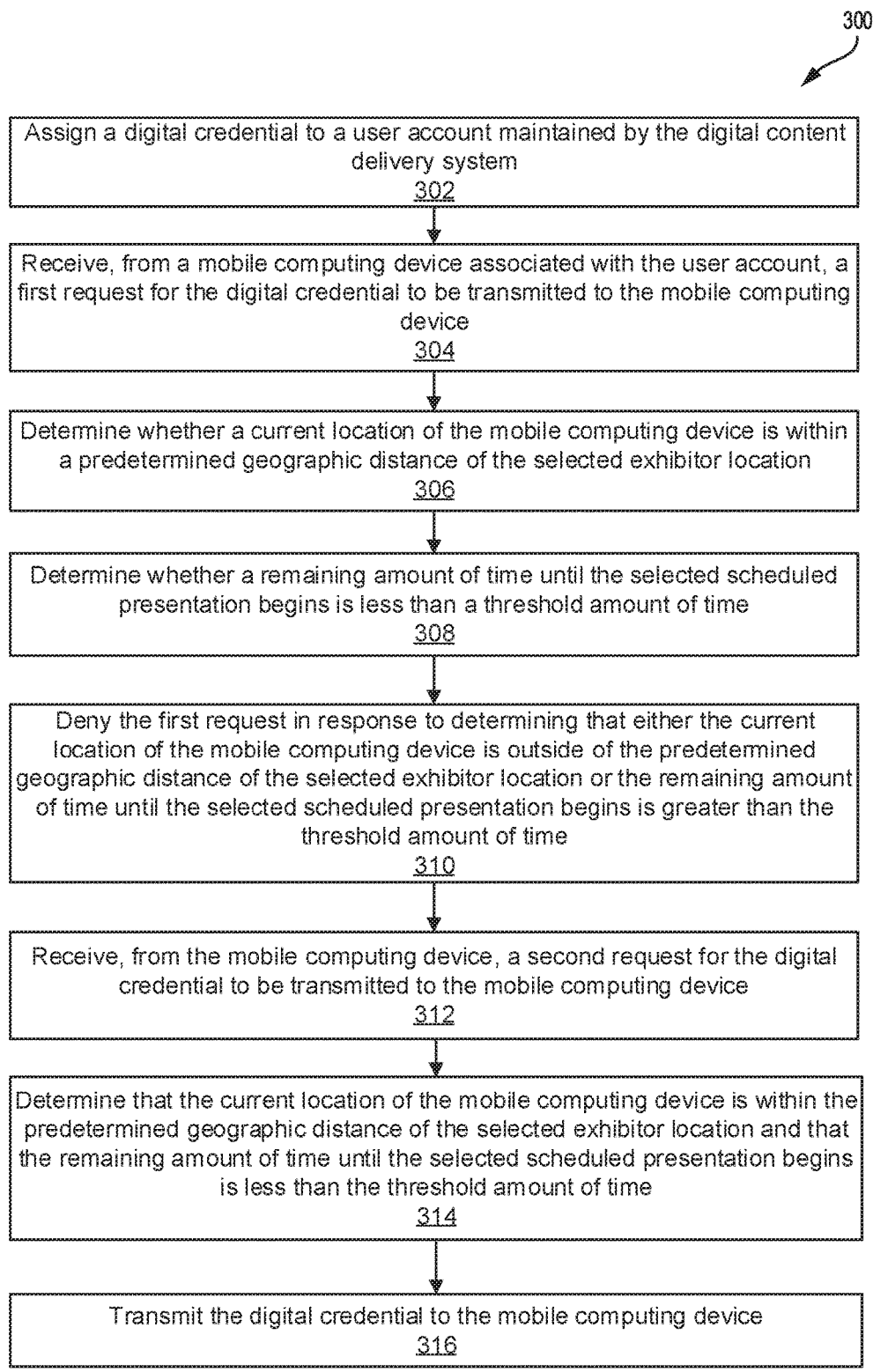
FIG. 3 is a flowchart showing an example method for issuing digital credentials.

FIG. 3 shows an example method 300 for issuing digital credentials. Method 300 may be embodied in computer readable instructions for execution by one or more computer processors such that the operations of method 300 may be performed in part or in whole by digital content delivery system 104; accordingly, the method 300 is described below by way of example with reference thereto. However, it shall be appreciated that at least some of the operations of method 300 may be deployed on various other hardware configurations and method 300 is not intended to be limited to digital content delivery system 104.

At operation 302, digital credential management module 214 assigns a digital credential to a user account maintained by digital content delivery system 104. For example, digital credential management module 214 can update a user account with reservation data associated with the digital credential. The digital credential can be redeemable at a selected exhibitor location to view a selected scheduled presentation of a digital content item. For example, the digital credential can be redeemed at a selected theatre to view a scheduled movie.

A license to access the digital content item may have been previously assigned to the user account. For example, the user may have previously purchased a license to rent the digital content item and view the digital content item using client-side digital content delivery device 106. The purchased license can also provide the user with the right to view a scheduled presentation of the digital content item at an exhibitor location. For example, the purchased license can allow a user to attend a screening of the movie at a selected movie theatre.

At operation 304, digital content delivery system 104 receives a first request for the digital credential to be transmitted to mobile computing device 202. Mobile computing device 202 is associated with the user account.

At operation 306, digital credential issuing module 218 determines whether a current location of mobile computing device 202 is within a predetermined geographic distance of the selected exhibitor location. In some embodiments, the first request received from mobile computing device 202 includes location data describing the current location of mobile computing device 202. Digital credential issuing module 218 uses the received location information to determine whether the current location of mobile computing device 202 is within a predetermined geographic distance of the selected exhibitor location.

At operation 308, digital credential issuing module 218 determines whether a remaining amount of time until a scheduled start time of the selected scheduled presentation is less than a threshold amount of time. For example, digital credential issuing module 218 can determine a current time and the scheduled start time of the selected scheduled presentation. Digital credential issuing module 218 can determine whether an amount of time between the current time and the scheduled start time is less than a threshold amount of time.

At operation 310, digital credential issuing module 218 denies the first request in response to determining that either the current location of mobile computing device 202 is outside of the predetermined geographic distance of the selected exhibitor location or the remaining amount of time until the scheduled start time of the selected scheduled presentation is greater than the threshold amount of time. As a result of the first request being denied, mobile computing device 202 will not receive and/or render the digital credential in response to the first request.

At operation 312, digital credential issuing module 218 receives, from mobile computing device 202, a second request for the digital credential assigned to be transmitted to mobile computing device 202. The second request can be received after the first request was denied. The second request can also include location data indicating the current location of mobile computing device 202.

At operation 314, digital credential issuing module 218 determines that the current location of mobile computing device 202 is within the predetermined geographic distance of the selected exhibitor location and that the remaining amount of time until the scheduled start time of the selected scheduled presentation is less than the threshold amount of time.

At operation 316, digital credential issuing module 218 transmits the digital credential to mobile computing device 202. After receiving the digital credential, mobile computing device 202 can render a visual representation of the digital credential on a display of mobile computing device 202, which can be redeemed to provide a user access to the selected scheduled presentation.

Figure 4:
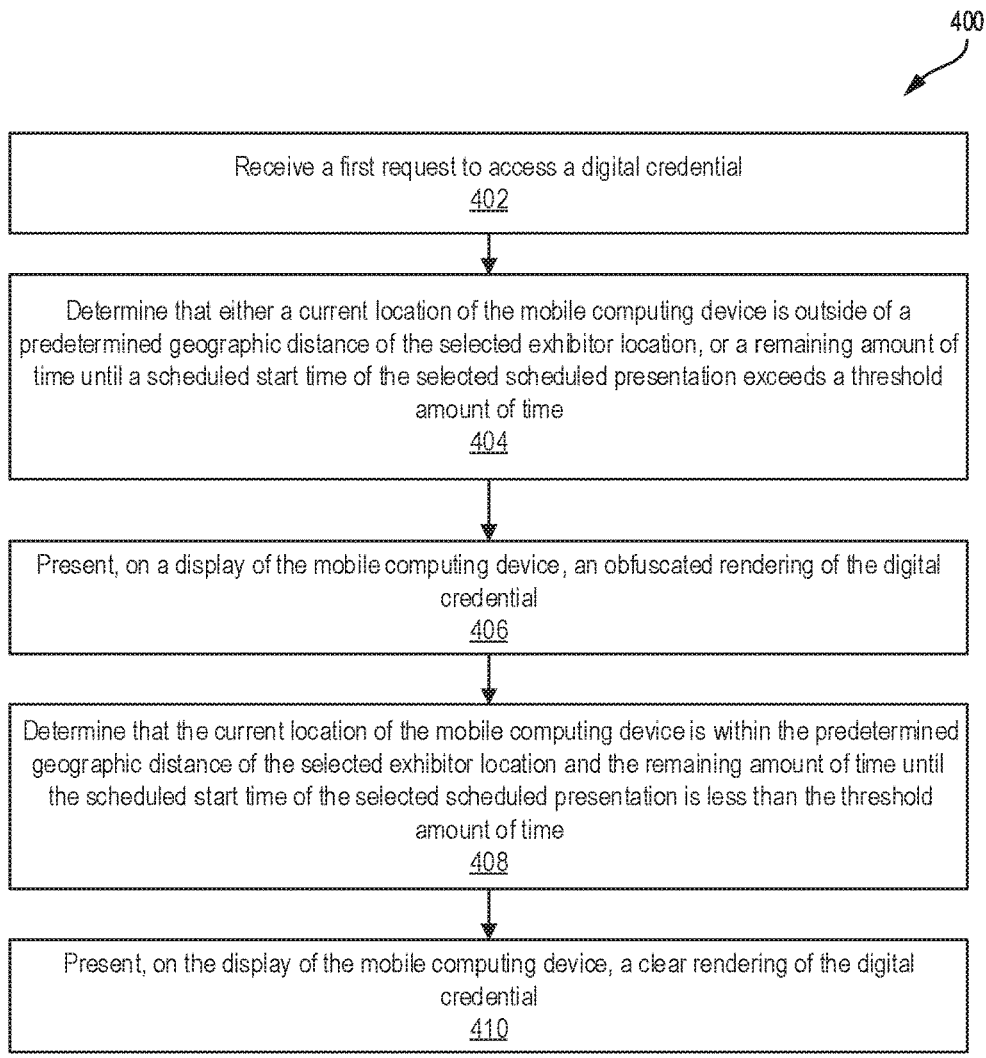
FIG. 4 is a flowchart showing an example method for issuing digital credentials.

FIG. 4 shows an example method 400 for issuing digital credentials. Method 400 may be embodied in computer readable instructions for execution by one or more computer processors such that the operations of method 400 may be performed in part or in whole by mobile computing device 202; accordingly, the method 400 is described below by way of example with reference thereto. However, it shall be appreciated that at least some of the operations of method 400 may be deployed on various other hardware configurations and method 400 is not intended to be limited to mobile computing device 202.

At operation 402, digital credential issuing module 218 receives a first request to access a digital credential. For example, a user of mobile computing device 202 may have caused the request using digital credential application 210. The digital credential can be assigned to the user account associated with mobile computing device 202 and be redeemable at a selected exhibitor location to view a selected scheduled presentation of a digital content item. In some embodiments, the digital content item is a movie and the selected exhibitor location is a movie theatre.

A license to access the digital content item may have previously been assigned to the user account, for example, as a result of the user having purchased a rental of the digital content item that is accessible from the user's client-side digital content delivery device 106. The license to access the digital content item allows the user of the user account to attend a scheduled presentation of the digital content item at an exhibitor location or access the digital content item from client-side digital content delivery device 106 that is associated with the user's account.

The user can utilize digital credential application 210 to select the exhibitor location and the scheduled presentation that the user would like to attend. For example, user interface module 212 can present, on the display of mobile computing device 202, one or more exhibitor locations where the user can view the digital content item, and receive a user input indicating that the user has selected the selected exhibitor location to view the digital content item. The interface module 212 can then present, on the display of the mobile computing device, a set of scheduled presentations of the digital content item that the user can select to attend.

After receiving a user input indicating that the user has selected to attend the selected scheduled presentation, digital credential application 210 can cause the digital credential to be assigned to the user account. For example, digital credential application 210 can instruct digital credential management module 214 to assign the digital credentials to the user account.

At operation 404, digital credential issuing module 218 determines that either a current location of mobile computing device 202 is outside of a predetermined geographic distance of the selected exhibitor location, or a remaining amount of time until a scheduled start time of the selected scheduled presentation transgresses a threshold amount of time. To prevent misuse, access to the digital credential can be contingent on both of these conditions being satisfied. Accordingly, the user cannot redeem the digital credential unless the user is within a predetermined distance of the exhibitor location and within a predetermined time prior to the schedules start time.

At operation 406, digital credential presentation module 216 presents, on a display of mobile computing device 202, an obfuscated rendering of the digital credential. An obfuscated rendering can be a visual rendering of the digital credential that has been sufficiently obfuscated (e.g., blurred, modified, etc.) such that the digital credential cannot be read and/or scanned by a scanning device or employee at the exhibitor location. For example, in some embodiments, the obfuscated rendering of the digital credential is an image of a scannable code that is sufficiently blurred such that the scannable code is unreadable by a scanning device. Hence, the obfuscated visual rendering of the scannable code is presented to the user, however cannot be redeemed to gain access to the scheduled presentation of the digital content item.

At operation 408, digital credential issuing module 218 determines that the current location of mobile computing device 202 is within the predetermined geographic distance of the selected exhibitor location and the remaining amount of time until the scheduled start time of the selected scheduled presentation is less than the threshold amount of time. According; both required conditions for access to the digital credential are met.

At operation 410, digital credential presentation module 216 presents, on the display of mobile computing device 202, a clear rendering of the digital credential. A clear rendering of the digital credential can be a visual rending of the digital credential that is sufficiently clear such that the digital credential can be scanned by a scanning device and/or read by an employee at the exhibitor location. For example; in some embodiments, the clear rendering of the digital credential is an image of the scannable code that is sufficiently clear such that the scannable code is readable by the scanning device. Accordingly, the user uses the clear rendering of the digital credential to gain access to the scheduled presentation of the digital content item.

Figure 5:
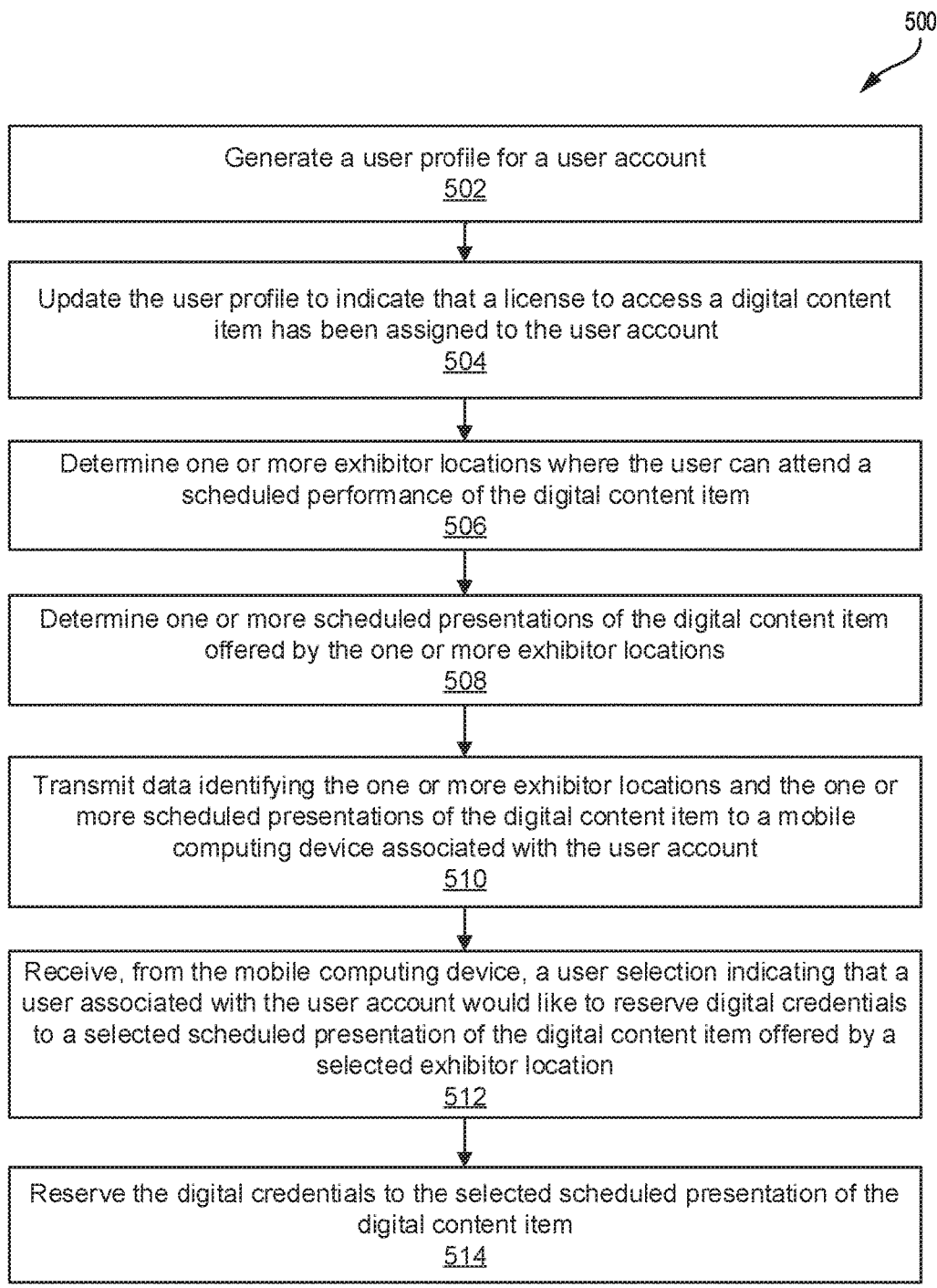
FIG. 5 is a flowchart showing an example method for reserving digital credentials to a scheduled presentation of a digital content item.

FIG. 5 shows an example method 500 for reserving digital credentials to a scheduled presentation of a digital content item. Method 500 may be embodied in computer readable instructions for execution by one or more computer processors such that the operations of method 500 may be performed in part or in whole by digital content delivery system 104; accordingly, method 500 is described below by way of example with reference thereto. However, it shall be appreciated that at least some of the operations of method 500 may be deployed on various other hardware configurations and method 500 is not intended to be limited to digital content delivery system 104.

At operation 502, digital content delivery system 104 generates a user profile for a user account. The generated user profile can be stored in user account database 110 maintained by digital content delivery system 104.

At operation 504, digital content delivery system 104 updates the user profile to indicate that a license to access a digital content item has been assigned to the user account. For example, the license can be a license to access and present a movie through client-side digital content delivery device 106 that associated with the user account. The license can further enable a user to attend a scheduled performance of the digital content item.

At operation 506, digital content delivery system 104 determines one or more exhibitor locations where the user can attend a scheduled performance of the digital content item. Digital content delivery system 104 can determine an exhibitor associated with the license assigned to the user account. For example, the exhibitor can be associated with the purchase of the license and, in some embodiments, received a portion of revenue from the purchase for the license to access the digital content item. Once digital content delivery system 104 determines the exhibitor associated with the license, digital content delivery system 104 can determine exhibitor locations associated with the exhibitor. This includes identifying all exhibitor locations associated with the exhibitor or a subset of the exhibitor locations. For example, digital content delivery system 104 can determine exhibitor locations that are located within a predetermined geographic distance of a dwelling associated with the user account.

At operation 508, digital content delivery system 104 determines one or more scheduled presentations of the digital content item offered by the one or more exhibitor locations. For example, digital content delivery system 104 can determine show times at which the digital content (e.g., movie) is playing at various movie theatres.

At operation 510, digital content delivery system 104 transmits data identifying the one or more exhibitor locations and the one or more scheduled presentations of the digital content item to mobile computing device 202 that is associated with the user account. Mobile computing device 202 can render a visual representation of the data and enable a user to browse through the available scheduled presentations as well as select to reserve digital credentials to a scheduled presentation.

At operation 512, digital content delivery system 104 receives, from mobile computing device 202, a user selection indicating that a user associated with the user account would like to reserve digital credentials to a selected scheduled presentation of the digital content item offered by a selected exhibitor location.

At operation 514, digital content delivery system 104 reserves the digital credentials to the selected scheduled presentation of the digital content item. For example, digital content delivery system 104 can transmit a reservation request to exhibitor management system 204 to reserve the digital credentials. Digital content delivery system 104 can additionally update the user's account to assign the reserved digital credentials to the users account. This includes updating the user's account with any reservation data received from exhibitor management system 204.

Figure 6A:
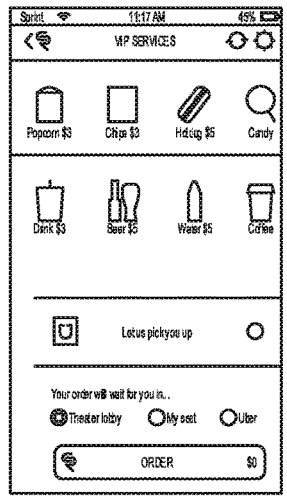

FIGS. 6A-6L show example screenshots of an exhibitor interface. As shown in FIG. 6A, the exhibitor interface can enable a user to reserve one or more amenities. For example, the user uses the exhibitor interface to select from and purchase food and/or beverages, as well as select a pickup location for the purchased food and/or beverages. The exhibitor interface can also user can also allow a user to schedule transportation to and/or from a scheduled presentation of a digital content item.

Figure 6B:
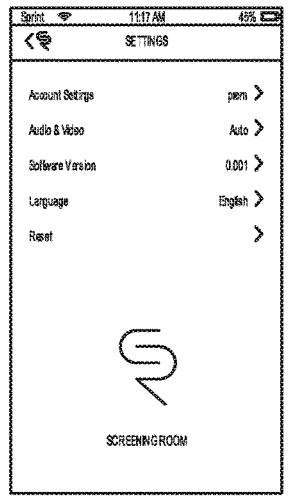

As shown in FIG. 6B, the exhibitor interface can allow a user to view and/or adjust configurations or settings. For example, the exhibitor interface can allow the user to view and/or adjust account settings, audio and video settings, software version and language settings. The exhibitor interface can also allow the user to reset the settings to their default settings.

Figure 6C:
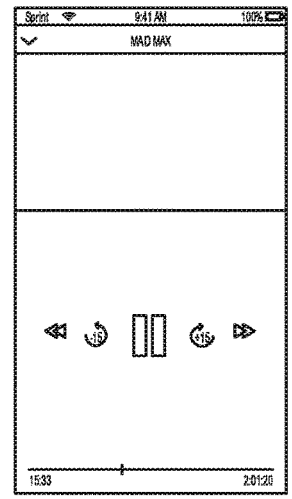

As shown in FIG. 6C, the exhibitor interface can present a user with video. For example, the exhibitor interface can allow the user to view movie trailers, reviews, etc. The exhibitor interface can also allow the user to control presentation of the video, such as fast forward, rewind, pause, play, etc.

Figure 6D:
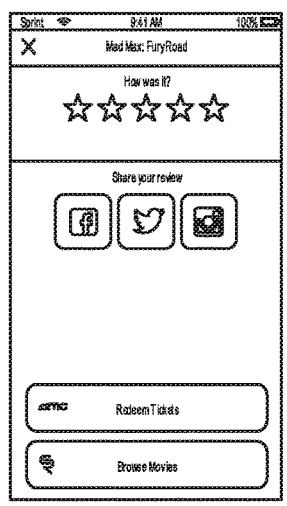

As shown in FIG. 6D, the exhibitor interface can enable the user to perform one or more functions. For example, the exhibitor interface can enable the user to review a digital content item, share the review via one or more social networking services, redeem digital credentials and/or browse movies.

Figure 6E:
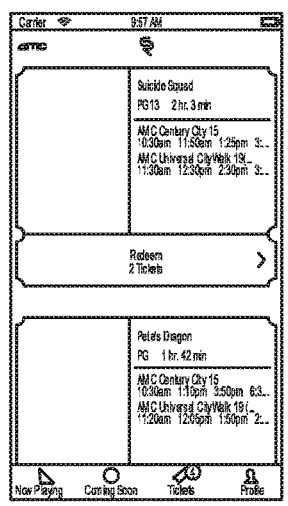

As shown in FIG. 6E, the exhibitor interface provides the user with data identifying scheduled presentations of digital content items. For example, the exhibitor interface provides the user with movie title descriptions, available locations and/or times. The exhibitor interface can also enable a user to select to reserve digital credentials to a selected movie.

Figure 6F:
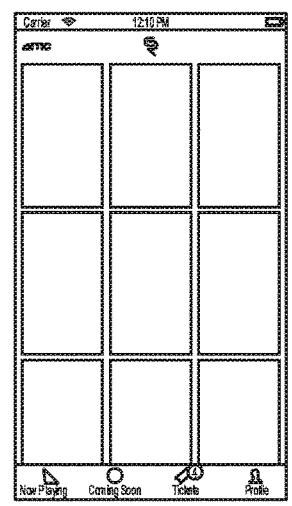

As shown in FIG. 6F, the exhibitor interface can present the user with multiple data tiles that include data and that can be selectable by a user. For example, each data tile includes data associated with a movie, such as images associated with the movie, description text, etc. Further, each data tile can be selectable to enable the user to access additional data.

As shown in FIG. 6G, the exhibitor interface provides the user with data identifying scheduled presentations of digital content items. For example, the exhibitor interface provides the user with movie title descriptions, available locations and/or times. The exhibitor interface can also enable a user to select to reserve digital credentials to a selected movie.

As shown in FIG. 6H, the exhibitor interface can present a visual rendering of a digital credential, such as a QR code. The visual rendering of the digital credential can allow a user to redeem the digital credential at an exhibitor location.

As shown in FIG. 6I, the exhibitor interface provides a user with a detailed written description of a movie. This includes a plot synopsis as well as a listing of key actors/actresses in the movie and the director.

As shown in FIG. 6J the exhibitor interface can enable a user to purchase digital credentials and/or a digital content license. As show, the exhibitor interface can enable the user to enter payment method data, such as credit card information. The exhibitor interface can also provide the user with the total cost for the requested purchase.

As shown in FIG. 6K, the exhibitor interface can present the user with data tiles representing scheduled presentations of a digital content item. Each data tile includes data describing its respective scheduled presentation, such as the scheduled start time of the scheduled presentation. Further, the data tiles can be interactive such that a user can select a data tile to receive addition information regarding the corresponding scheduled presentation and/or to reserve digital credentials for the scheduled presentation.

As shown in FIG. 6L, the exhibitor interface can present the user with a seating map identifying the seats at an exhibitor location. The seating map can indicate which seats are reserved and which seats remain available. The seating map can be interactive to allow a user to reserve seats.

Figure 7A:
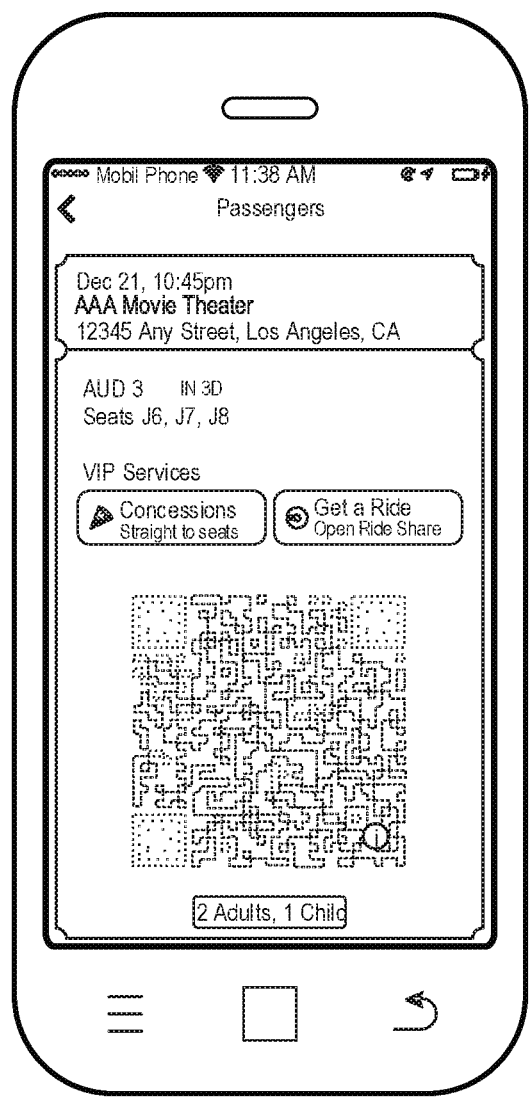
FIGS. 7A-7C are screenshots showing example renderings a digital credential.
Figure 7B:
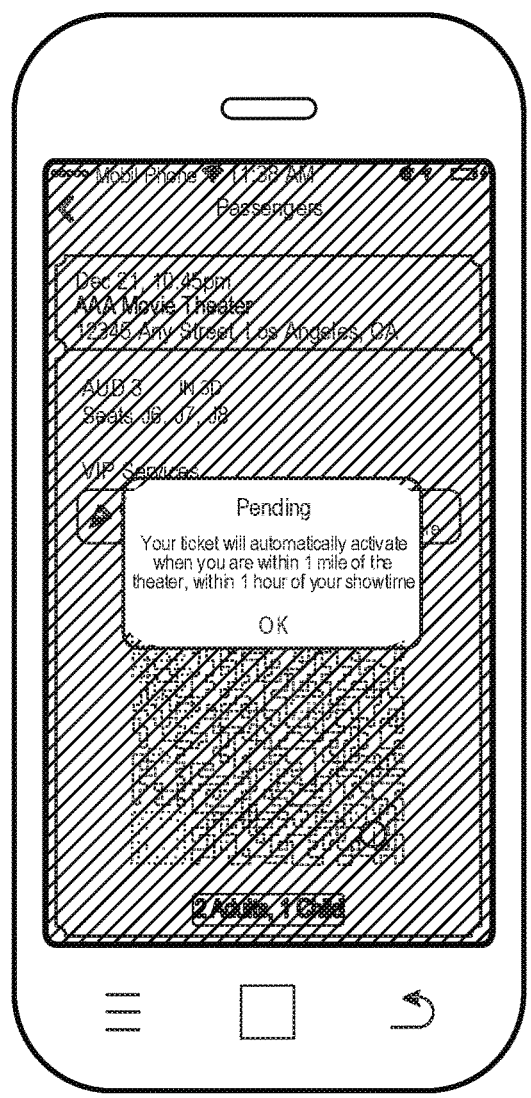
Figure 7C:
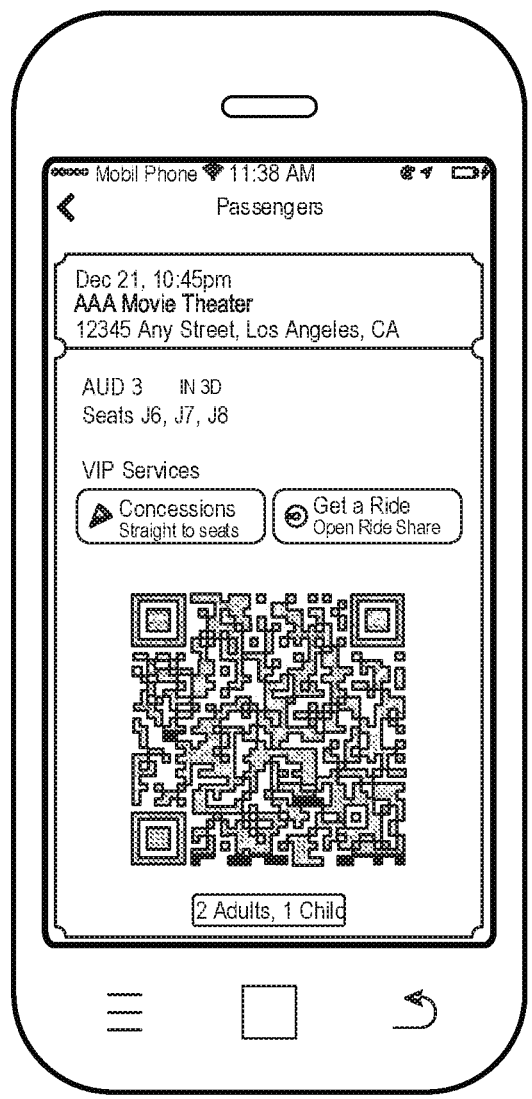

FIGS. 7A-7C show example renderings of a digital credential. In FIG. 7A, an obfuscated rendering of a digital credential is presented. While a user can see the readable code, the readable code is sufficiently blurred such that a scanning device could not scan the readable code.

In FIG. 7B, an obfuscated rendering of a digital credential is presented along with a message indicating conditions that must be met for a clear rendering of the digital credential to be presented. As shown, the digital credential will automatically activate when the user is within 1 mile of the theatre and within 1 hour of the show time.

In FIG. 7C, a clear rendering of a digital credential is presented. The digital credential is a QR code that is clearly visible and can be scanned by a scannable device at an exhibitor location.

Software Architecture

Figure 8:
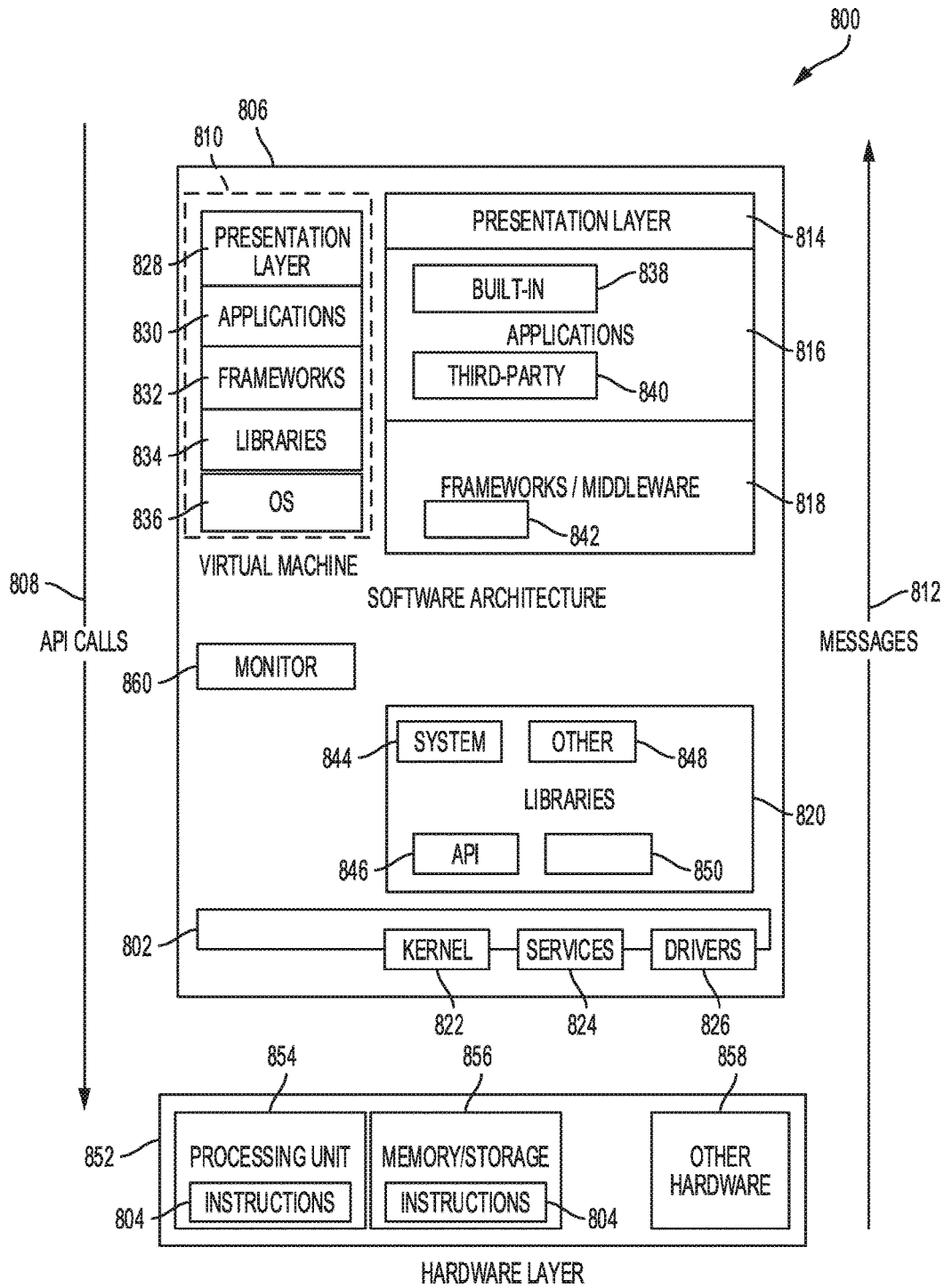
FIG. 8 is a block diagram illustrating a representative software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. Software architecture 806 may execute on hardware such as machine 900 of FIG. 9 that includes, among other things, processors 904, memory 914, and input/output (I/O) components 918. A representative hardware layer 852 is illustrated and can represent, for example, machine 900 of FIG. 9. Representative hardware layer 852 includes processing unit 854 having associated executable instructions 804. Executable instructions 804 represent the executable instructions of software architecture 806, including implementation of the methods, modules and so forth described herein. Hardware layer 852 also includes memory and/or storage modules memory/storage 856, which also have executable instructions 804. Hardware layer 852 may also comprise other hardware 858.

In the example architecture of FIG. 8, software architecture 806 may be conceptualized as a stack of layers where each layer provides particular functionality. For example, software architecture 806 may include layers such as operating system 802, libraries 820, applications 816 and a presentation layer 814. Operationally, applications 816 and/or other components within the layers may invoke application programming interface (API) API calls 808 through the software stack and receive a response as in response to API calls 808. The layers illustrated are representative in nature and not all software architectures have all layers. For example, some mobile or special purpose operating systems may not provide frameworks/middleware 818, while others may provide such a layer. Other software architectures may include additional or different layers.

Operating system 802 may manage hardware resources and provide common services. Operating system 802 may include, for example, kernel 822, services 824, and drivers 826. Kernel 822 may act as an abstraction layer between the hardware and the other software layers. For example, kernel 822 may be responsible for memory management, processor management (e.g., scheduling), component management, networking, security settings, and so on. Services 824 may provide other common services for the other software layers. Drivers 826 may be responsible for controlling or interfacing with the underlying hardware. For instance, drivers 826 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

Libraries 820 may provide a common infrastructure that may be used by applications 816 and/or other components and/or layers. Libraries 820 typically provide functionality that allows other software modules to perform tasks in an easier fashion than to interface directly with the underlying operating system 802 functionality (e.g., kernel 822, services 824 and/or drivers 826). Libraries 820 may include system libraries 844 (e.g., C standard library) that may provide functions such as memory allocation functions, string manipulation functions, mathematic functions, and the like. In addition, libraries 820 may include API libraries API 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic movie on a display), database libraries (e.g., SQLite that may provide various relational database functions), web libraries (e.g., WebKit that may provide web browsing functionality), and the like. Libraries 820 may also include a wide variety of other libraries 850 to provide many other APIs to applications 816 and other software components/modules.

The frameworks frameworks/middleware 818 (also sometimes referred to as middleware) provide a higher-level common infrastructure that may be used by applications 816 and/or other software components/modules. For example, frameworks/middleware 818 may provide various graphic user interface (GUI) functions, high-level resource management, high-level location services, and so forth. Frameworks/middleware 818 may provide a broad spectrum of other APIs that may be utilized by applications 816 and/or other software components/modules, some of which may be specific to a particular operating system or platform.

Applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include any application developed using the Android™ or iOS™ software development kit (SDK) by an entity other than the vendor of the particular platform, and may be mobile software running on a mobile operating system such as iOS™ Android™, Windows® Phone, or other mobile operating systems. Third-party applications 840 may invoke the API calls 808 provided by the mobile operating system such as operating system 802 to facilitate functionality described herein.

Applications 816 may use built-in operating system functions (e.g., kernel 822, services 824 and/or drivers 826), libraries 820, frameworks/middleware 818 to create user interfaces to interact with users of the system. Alternatively, or additionally, in some systems interactions with a user may occur through a presentation layer, such as presentation layer 814. In these systems, the application/module "logic" can be separated from the aspects of the application/module that interact with a user.

Some software architectures use virtual machines the example of FIG. 8, this is illustrated by virtual machine 810. Virtual machine 810 creates a software environment where applications/modules can execute as if they were executing on a hardware machine (such as the machine 900 of FIG. 9, for example). Virtual machine 810 is hosted by a host operating system (operating system (OS) 836 in FIG. 8) and typically, although not always, has a virtual machine monitor 860, which manages the operation of virtual machine 810 as well as the interface with the host operating system (i.e., operating system 802). A software architecture executes within the virtual machine 810 such as operating system (OS) 836, libraries 834, frameworks 832, applications 830 and/or presentation layer 828. These layers of software architecture executing within the virtual machine 810 can be the same as corresponding layers previously described or may be different.

Figure 9:
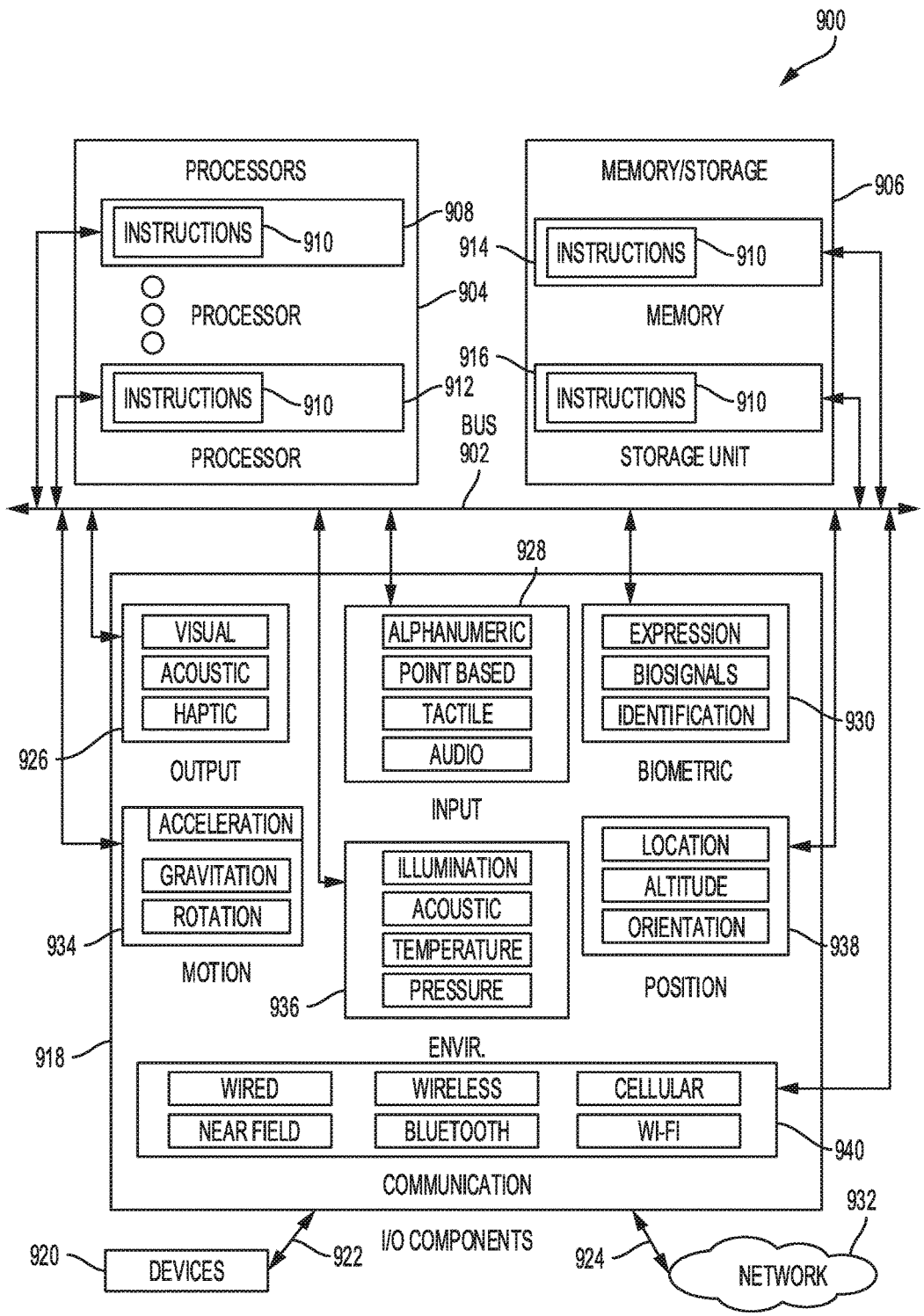
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of machine 900, according to some example embodiments, able to read instructions from a machine-readable medium (e.g., a machine-readable storage medium) and perform any one or more of the methodologies discussed herein. Specifically, FIG. 9 shows a diagrammatic representation of machine 900 in the example form of a computer system, within which instructions 910 (e.g., software, a program, an application, an applet, an app, or other executable code) for causing machine 900 to perform any one or more of the methodologies discussed herein may be executed. As such, the instructions 910 may be used to implement modules or components described herein. The instructions 910 transform the general, non-programmed machine into a particular machine programmed to carry out the described and illustrated functions in the manner described. In alternative embodiments, machine 900 operates as a standalone device or may be coupled (e.g., networked) to other machines. In a networked deployment, machine 900 may operate in the capacity of a server machine or a client machine in a server-client network environment, or as a peer machine in a peer-to-peer (or distributed) network environment. Machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile computing device, a wearable device (e.g., a smart watch), a smart home device (e.g., a smart appliance), other smart devices, a web appliance, a network router, a network switch, a network bridge, or any machine capable of executing instructions 910, sequentially or otherwise, that specify actions to be taken by machine 900. Further, while only a single machine 900 is illustrated, the term "machine" shall also be taken to include a collection of machines that individually or jointly execute instructions 910 to perform any one or more of the methodologies discussed herein.

Machine 900 may include processors 904, memory memory/storage 906, and input/output (I/O) components 918, which may be configured to communicate with each other such as via bus 902. Memory/storage 906 may include memory 914, such as a main memory, or other memory storage, and storage unit 916, both accessible to processors 904 such as via bus 902. Storage unit 916 and memory 914 store instructions 910 embodying any one or more of the methodologies or functions described herein. Instructions 910 may also reside, completely or partially, within memory 914, within storage unit 916, within at least one of processors 904 (e.g., within the processor's cache memory), or any suitable combination thereof, during execution thereof by the machine 900. Accordingly, memory 914, storage unit 916, and memory of processors 904 are examples of machine-readable media.

The input/output (I/O) components 918 may include a wide variety of components to receive input, provide output, produce output, transmit information, exchange information, capture measurements, and so on. The specific input/output (I/O) components 918 that are included in a particular machine will depend on the type of machine. For example, portable machines such as mobile phones will likely include a touch input device or other such input mechanisms, while a headless server machine will likely not include such a touch input device. It will be appreciated that input/output (I/O) components 918 may include many other components that are not shown in FIG. 9, Input/output (I/O) components 918 are grouped according to functionality merely for simplifying the following discussion and the grouping is in no way limiting. In various example embodiments, input/output (I/O) components 918 may include output components 926 and input components 928. Output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. Input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, input/output (I/O) components 918 may include biometric components 930, motion components 934, environmental components 936, or position components 938 among a wide array of other components. For example, biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. Motion components 934 may include acceleration sensor components (e.g., accelerometer), gravitation sensor components, rotation sensor components (e.g., gyroscope), and so forth. Environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. Position components 938 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. Input/output (I/O) components 918 may include communication components 940 operable to couple the machine 900 to network 9:32 or devices 920 via coupling 922 and coupling 924, respectively. For example, communication components 940 may include a network interface component or other suitable device to interface with network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. Devices 920 may be another machine or any of a wide variety of peripheral devices (e.g., a peripheral device coupled via a Universal Serial Bus (USB)).

Moreover, communication components 940 may detect identifiers or include components operable to detect identifiers. For example, the communication components 940 may include Radi© Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geo-location, location via Wi-Fi® signal triangulation, location via detecting a NFC beacon signal that may indicate a particular location, and so forth.

What is claimed is:

1. A method comprising:
  receiving, by a mobile phone, a first request to access a digital credential assigned to a user account associated with the mobile phone, the first request initiated as a result of a user selection on the mobile phone to access the digital credential, the digital credential being redeemable at a selected exhibitor location to view a selected scheduled presentation of a digital movie, a license to access the digital movie having previously been assigned to the user account;
  in response to receiving the first request, determining that either a current location of the mobile phone is outside of a predetermined geographic distance of the selected exhibitor location, or a remaining amount of time until a scheduled start time of the selected scheduled presentation transgresses a threshold amount of time, yielding a first determination;
  in response to the first determination, presenting, on a display of the mobile phone, an obfuscated rendering of the digital credential, the obfuscated rendering being unredeemable at the selected exhibitor location to view the selected scheduled presentation of the digital movie;
  after presenting the obfuscated rendering of the digital credential, determining that the current location of the mobile computing device is within the predetermined geographic distance of the selected exhibitor location and the remaining amount of time until the scheduled start time of the selected scheduled presentation is less than the threshold amount of time, yielding a second determination: and
  in response to the second determination, presenting, on the display of the mobile phone, a clear rendering of the digital credential, the clear rendering of the digital credential being redeemable at the selected exhibitor location to view the selected scheduled presentation of the digital movie.

2. The method of claim 1, wherein the selected exhibitor location is a movie theatre.

3. The method of claim 1, wherein the obfuscated rendering of the digital credential is an image of a scannable code that is sufficiently obfuscated such that the scannable code is unreadable by a scanning device.

4. The method of claim 1, wherein the license to access the digital movie allows a user of the user account to attend a scheduled presentation of the digital movie at an exhibitor location or access the digital movie from a client-side digital content delivery device associated with the user account.

5. The method of claim 1, further comprising:
  presenting, on the display of the mobile phone, one or more exhibitor locations where a user can view the digital movie; and
  receiving a user input indicating that a user of the user account has selected the selected exhibitor location to view the digital movie.

6. The method of claim 3, wherein the clear rendering of the digital credential is an image of the scannable code that is sufficiently clear such that the scannable code is readable by the scanning device.

7. The method of claim 5, further comprising:
  presenting, on the display of the mobile phone, a set of scheduled presentations of the digital movie that the user can select to attend;
  receiving a user input indicating that the user has selected to attend the selected scheduled presentation; and
  causing the digital credential to be assigned to the user account.

8. A mobile computing device comprising:
  one or more computer processors; and
  one or more computer-readable mediums storing instructions that, when executed by the one or more computer processors, cause the mobile computing device to perform operations comprising:
    receiving a first request to access a digital credential assigned to a user account associated with the mobile computing device, the first request initiated as a result of a user selection on the mobile computing device to access the digital credential, the digital credential being redeemable at a selected exhibitor location to view a selected scheduled presentation of a digital movie, a license to access the digital movie having previously been assigned to the user account;
    in response to receiving the first request, determining that either a current location of the mobile computing device is outside of a predetermined geographic distance of the selected exhibitor location, or a remaining amount of time until a scheduled start time of the selected scheduled presentation transgresses a threshold amount of time, yielding a first determination;
    in response to the first determination, presenting, on a display of the mobile computing device, an obfuscated rendering of the digital credential, the obfuscated rendering being unredeemable at the selected exhibitor location to view the selected scheduled presentation of the digital movie;
    after presenting the obfuscated rendering of the digital credential, determining that the current location of the mobile computing device is within the predetermined geographic distance of the selected exhibitor location and the remaining amount of time until the scheduled start time of the selected scheduled presentation is less than the threshold amount of time, yielding a second determination; and in response to the second determination, presenting, on the display of the mobile computing device, a clear rendering of the digital credential, the clear rendering of the digital credential being redeemable at the selected exhibitor location to view the selected scheduled presentation of the digital movie.

9. The mobile computing device of claim 8, wherein the selected exhibitor location is a movie theatre.

10. The mobile computing device of claim 8, wherein the obfuscated rendering of the digital credential is an image of a scannable code that is sufficiently blurred such that the scannable code is unreadable by a scanning device.

11. The mobile computing device of claim 8, wherein the license to access the digital movie allows a user of the user account to attend a scheduled presentation of the digital movie at an exhibitor location or access the digital movie from a client-side digital content delivery device associated with the user account.

12. The mobile computing device of claim 8, the operations further comprising:

presenting, on the display of the mobile computing device, one or more exhibitor locations where a user can view the digital movie; and receiving a user input indicating that a user of the user account has selected the selected exhibitor location to view the digital movie.

13. The mobile computing device of claim 10, wherein the clear rendering of the digital credential is an image of the scannable code that is sufficiently clear such that the scannable code is readable by the scanning device.

14. The mobile computing device of claim 12, the operations further comprising:

presenting, on the display of the mobile computing device, a set of scheduled presentations of the digital movie that the user can select to attend;

receiving a user input indicating that the user has selected to attend the selected scheduled presentation; and causing the digital credential to be assigned to the user account.

15. A non-transitory computer-readable medium storing instructions that, when executed by a mobile computing device, cause the mobile computing device to perform operations comprising:

receiving a first request to access a digital credential assigned to a user account associated with the mobile computing device, the first request initiated as a result of a user selection on the mobile computing device to access the digital credential, the digital credential being redeemable at a selected exhibitor location to view a selected scheduled presentation of a digital movie, a license to access the digital movie having previously been assigned to the user account;

in response to receiving the first request, determining that either a current location of the mobile computing device is outside of a predetermined geographic distance of the selected exhibitor location, or a remaining amount of time until a scheduled start time of the selected scheduled presentation transgresses a threshold amount of time, yielding a first determination;

in response to the first determination, presenting, on a display of the mobile computing device, an obfuscated rendering of the digital credential, the obfuscated rendering being unredeemable at the selected exhibitor location to view the selected scheduled presentation of the digital movie;

after presenting the obfuscated rendering of the digital credential, determining that the current location of the mobile computing device is within the predetermined geographic distance of the selected exhibitor location and the remaining amount of time until the scheduled start time of the selected scheduled presentation is less than the threshold amount of time, yielding a second determination; and in response to the second determination, presenting, on the display of the mobile computing device, a clear rendering of the digital credential, the clear rendering of the digital credential being redeemable at the selected exhibitor location to view the selected scheduled presentation of the digital movie.

16. The non-transitory computer-readable medium of claim 15, wherein the selected exhibitor location is a movie theatre.

17. The non-transitory computer-readable medium of claim 15, wherein the obfuscated rendering of the digital credential is an image of a scannable code that is sufficiently blurred such that the scannable code is unreadable by a scanning device.

18. The non-transitory computer-readable medium of claim 15, wherein the license to access the digital movie allows a user of the user account to attend a scheduled presentation of the digital movie at an exhibitor location or access the digital movie from a client-side digital content delivery device associated with the user account.

19. The non-transitory computer-readable medium of claim 15, the operations further comprising:

presenting, on the display of the mobile computing device, one or more exhibitor locations where a user can view the digital movie;

receiving a user input indicating that a user of the user account has selected the selected exhibitor location to view the digital movie;

presenting, on the display of the mobile computing device, a set of scheduled presentations of the digital movie that the user can select to attend;

receiving a user input indicating that the user has selected to attend the selected scheduled presentation; and causing the digital credential to be assigned to the user account.

20. The non-transitory computer-readable medium of claim 17, wherein the clear rendering of the digital credential is an image of the scannable code that is sufficiently clear such that the scannable code is readable by the scanning device.

* * * * *